(12) United States Patent
Wang et al.

(10) Patent No.: US 9,923,683 B2
(45) Date of Patent: Mar. 20, 2018

(54) METHOD AND APPARATUS FOR LOCAL DATA CACHING

(75) Inventors: Carl Wang, Melville, NY (US); Ravikumar V. Pragada, Collegeville, PA (US); Philip J. Pietraski, Jericho, NY (US); Samian Kaur, Plymouth Meeting, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 735 days.

(21) Appl. No.: 14/009,917

(22) PCT Filed: Apr. 6, 2012

(86) PCT No.: PCT/US2012/032549
§ 371 (c)(1),
(2), (4) Date: Feb. 18, 2014

(87) PCT Pub. No.: WO2012/139016
PCT Pub. Date: Oct. 11, 2012

(65) Prior Publication Data
US 2014/0153504 A1  Jun. 5, 2014

Related U.S. Application Data

(60) Provisional application No. 61/473,023, filed on Apr. 7, 2011.

(51) Int. Cl.
*H04W 72/12* (2009.01)
*H04L 5/00* (2006.01)
(Continued)

(52) U.S. Cl.
CPC ...... *H04L 5/0035* (2013.01); *G06F 17/30902* (2013.01); *H04L 47/40* (2013.01);
(Continued)

(58) Field of Classification Search
None
See application file for complete search history.

(56) References Cited

U.S. PATENT DOCUMENTS

2001/0017850 A1* 8/2001 Kalliokulju .......... H04L 69/324
370/331
2010/0138541 A1   6/2010 Zhu et al.
(Continued)

FOREIGN PATENT DOCUMENTS

CN      101047967 A    10/2007
EP      1860894 A1     11/2007
(Continued)

OTHER PUBLICATIONS

Liu et al., "A 25 Gb/s(km²) Urban Wireless Network Beyond IMT-Advanced," IEEE Communications Magazine, vol. 49, No. 2 (Feb. 2011).
(Continued)

*Primary Examiner* — Shukri Taha
*Assistant Examiner* — Manuel Rangel
(74) *Attorney, Agent, or Firm* — Volpe and Koening, P.C.

(57) ABSTRACT

Methods and apparatus for local data caching are disclosed. Data may be stored in a local data storage connected to a base station or network nodes. The data flow may be split. The base station may coordinate with a cooperating base station for split-data transmission of locally cached data. Data may be split at different layers.

16 Claims, 24 Drawing Sheets

(51) Int. Cl.
*H04W 28/14* (2009.01)
*H04W 4/18* (2009.01)
*H04L 12/893* (2013.01)
*G06F 17/30* (2006.01)
*H04W 88/08* (2009.01)
*H04L 29/08* (2006.01)

(52) U.S. Cl.
CPC .......... *H04L 67/288* (2013.01); *H04L 67/289* (2013.01); *H04L 67/2842* (2013.01); *H04W 4/18* (2013.01); *H04W 28/14* (2013.01); *H04W 72/12* (2013.01); *H04L 67/22* (2013.01); *H04W 88/08* (2013.01)

(56) References Cited

U.S. PATENT DOCUMENTS

| | | | |
|---|---|---|---|
| 2010/0303039 A1 | 12/2010 | Zhang et al. | |
| 2011/0110450 A1* | 5/2011 | Gomadam | H04B 17/24 375/267 |
| 2011/0116460 A1* | 5/2011 | Kovvali | H04L 47/621 370/329 |
| 2012/0002743 A1* | 1/2012 | Cavalcante | H04B 7/024 375/267 |
| 2012/0102140 A1* | 4/2012 | Nadas | H04L 43/0888 709/213 |
| 2012/0163315 A1* | 6/2012 | Govindappa | H04L 1/1874 370/329 |

FOREIGN PATENT DOCUMENTS

| | | |
|---|---|---|
| WO | 09/092440 | 7/2009 |
| WO | 2010017308 A1 | 2/2010 |
| WO | 10/151193 | 12/2010 |
| WO | 11/100492 | 8/2011 |
| WO | 11/100673 | 8/2011 |

OTHER PUBLICATIONS

Third Generation Partnership Project, "Technical Specification Group Radio Access Network; Evolved Universal Terrestrial Radio Access (E-UTRA); Further advancements for E-UTRA physical layer aspects (Release 9)," 3GPP TR 36.814 V9.0.0 (Mar. 2010).
Third Generation Partnership Project, "Technical Specification Group Radio Access Network; Evolved Universal Terrestrial Radio Access Network (E-UTRAN); S1 Application Protocol (S1AP) (Release 8)," 3GPP TS 36.413 V8.10.0 (Jun. 2010).
Third Generation Partnership Project, "Technical Specification Group Radio Access Network; Evolved Universal Terrestrial Radio Access Network (E-UTRAN); S1 Application Protocol (S1AP) (Release 9)," 3GPP TS 36.413 V9.8.0 (Dec. 2011).
Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.5.0 (Mar. 2012).
Third Generation Partnership Project, "Technical Specification Group Radio Access Network; Evolved Universal Terrestrial Radio Access Network (E-UTRAN); X2 application protocol (X2AP) (Release 9)," 3GPP TS 36.423 V8.9.0 (Mar. 2010).
Third Generation Partnership Project, "Technical Specification Group Radio Access Network; Evolved Universal Terrestrial Radio Access Network (E-UTRAN); X2 application protocol (X2AP) (Release 9)," 3GPP TS 36.423 V9.6.0 (Mar. 2011).
Third Generation Partnership Project, "Technical Specification Group Radio Access Network; Evolved Universal Terrestrial Radio Access Network (E-UTRAN); X2 application protocol (X2AP) (Release 10)," 3GPP TS 36.423 V10.5.0 (Mar. 2012).
Third Generation Partnership Project, "Technical Specification Group Radio Access Network; Evolved Universal Terrestrial Radio Access Network (E-UTRAN); X2 application protocol (X2AP) (Release 11)," 3GPP TS 36.423 V11.0.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.13.0 (Mar. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.6.0 (Mar. 2011).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.1.0 (Mar. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).
Third Generation Partnership Project, "Technical Specification Group Radio Access Network; Evolved Universal Terrestrial Radio Access Network (E-UTRAN); X2 application protocol (X2AP) (Release 10)," 3GPP TS 36.423 V10.1.0 (Mar. 2011).
Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.1.0 (Mar. 2011).
Third Generation Partnership Project, "Technical Specification Group Radio Access Network; Evolved Universal Terrestrial Radio Access Network (E-UTRAN); S1 Application Protocol (S1AP) (Release 9)," 3GPP TS 36.331 V9.6.0 (Mar. 2011).
Third Generation Partnership Project, "Technical Specification Group Services and Architecture; Optimisations and Enhancements for Realtime IMS communication (Release 7)," 3GPP TR 23.818 V0.10.0 (Feb. 2007).
Third Generation Partnership Project, "Technical Specification Group Services and System Aspects; Policy and charging control architecture (Release 7)," 3GPP TS 23.203 V7.12.0 (Dec. 2009).
Third Generation Partnership Project, "Technical Specification Group Services and System Aspects; Policy and charging control architecture (Release 7)," 3GPP TS 23.203 V7.13.0 (Mar. 2012).
Third Generation Partnership Project, "Technical Specification Group Services and System Aspects; Policy and charging control architecture (Release 8)," 3GPP TS 23.203 V8.11.0 (Sep. 2010).
Third Generation Partnership Project, "Technical Specification Group Services and System Aspects; Policy and charging control architecture (Release 8)," 3GPP TS 23.203 V8.13.0 (Mar. 2012).
Third Generation Partnership Project, "Technical Specification Group Services and System Aspects; Policy and charging control architecture (Release 9)," 3GPP TS 23.203 V9.8.0 (Mar. 2011).
Third Generation Partnership Project, "Technical Specification Group Services and System Aspects; Policy and charging control architecture (Release 9)," 3GPP TS 23.203 V9.11.0 (Mar. 2012).
Third Generation Partnership Project, "Technical Specification Group Services and System Aspects; Policy and charging control architecture (Release 10)," 3GPP TS 23.203 V10.3.0 (Mar. 2011).
Third Generation Partnership Project, "Technical Specification Group Services and System Aspects; Policy and charging control architecture (Release 10)," 3GPP TS 23.203 V10.6.0 (Mar. 2012).
Third Generation Partnership Project, "Technical Specification Group Services and System Aspects; Policy and charging control architecture (Release 11)," 3GPP TS 23.203 V11.1.0 (Mar. 2011).
Third Generation Partnership Project, "Technical Specification

(56) References Cited

OTHER PUBLICATIONS

Group Services and System Aspects; Policy and charging control architecture (Release 11)," 3GPP TS 23.203 V11.5.0 (Mar. 2012).

* cited by examiner

| INFORMATION ELEMENTS | P | CONDITION/ COMMENT | IE TYPE |
|---|---|---|---|
| PROCEDURE TRANSACTION id (PTI) | C | This IE shall be sent on the S5/S8 and S4/S11 interfaces when the procedure was initiated by a WTRU Requested Bearer Resource Modification Procedure or Secondary PDP Context Activation Procedure. The PTI shall be the same as the one used in the corresponding Bearer Resource Command. | PTI |
| LINKED BEARER IDENTITY (LBI) | M | This IE shall be included to indicate the default bearer associated with the PDN connection. | EBI |
| PROTOCOL CONFIGURATION OPTIONS (PCO) | O | This IE may be sent on the S5/S8 and S4/S11 interfaces. | PCO |
| BEARER CONTEXTS | M | Several IEs with this type and instance values shall be included as necessary to represent a list of Bearers. | BEARER CONTEXTS |
| PGW-FQ-CSID | C | This IE shall be included by the PGW on the S5/S8 and S2b interfaces and, when received from S5/S8 be forwarded by the SGW on the S11 interface according to the requirements in 3GPP TS 23.007 [17]. | FQ-CSID |
| SGW-FQ-CSID | C | This IE shall be included by the SGW on the S11 interface according to the requirements in 3GPP TS 23.007 [17]. | FQ-CSID |
| CHANGE REPORTING ACTION | C | This IE shall be included on the S5/S8 and S4/S11 interfaces with the appropriate Action field If the location Change Reporting mechanism is to be started or stopped for this subscriber in the SGSN/MME. | CHANGE REPORTING ACTION |
| CSG INFORMATION REPORTING ACTION | CO | This IE shall be included on the S5/S8 and S4/S11 interfaces with the appropriate Action field if the CSG Info reporting mechanism is to be started or stopped for this subscriber in the SGSN/MME. | CSG INFORMATION REPORTING ACTION |
| CACHED CONTENT PRESENT | O | This IE may be sent on S5/S8 interfaces when one or more bearers are serviced by cached data from one or more content servers. | CACHED DATA |
| PRIVATE EXTENSION | O | This IE may be sent on the S5/S8, S4/S11 and S2b interfaces. | PRIVATE EXTENSION |

FIG. 12

| OCTETS 1 | BEARER CONTEXT IE TYPE=93 (DECIMAL) | | |
|---|---|---|---|
| OCTETS 2 AND 3 | LENGTH=n | | |
| OCTETS 4 | SPARE AND INSTANCE FIELDS | | |
| INFORMATION ELEMENTS | P | CONDITION/ COMMENT | IE TYPE |
| EPS BEARER ID | M | This IE shall be set to 0. | EBI |
| TFT | M | This IE can contain both uplink and downlink packet filters to be sent to the WTRU or the ePDG. | BEARER TFT |
| S1-U SGW F-TEID | C | This IE shall be sent on the S11 interface if the S1-U interface is used. | F-TEID |
| S5/8-U PGW F-TEID | C | This IE shall be sent on the S4, S5/S8 and S11 interfaces for GTP-based S5/S8 interface. The MME/SGSN shall ignore the IE on S11/S4 for PMIP-based S5/S8 interface. | F-TEID |
| S12 SGW F-TEID | C | This IE shall be sent on the S4 interface if the S12 interface is used. | F-TEID |
| S4-U SGW F-TEID | C | This IE shall be sent on the S4 interface if the S4-U interface is used. | F-TEID |
| S2b-U PGW F-TEID | C | This IE (for user plane) shall be sent on the S2b interface. | F-TEID |
| BEARER LEVEL QoS | M | | BEARER QoS |
| CHARGING Id | C | This IE shall be sent on the S5/S8 interface. | CHARGING Id |
| | O | If the S5/S8 interface is GTP, this IE may be sent on the S4 interface, in order to support CAMEL charging at the SGSN. | |
| BEARER FLAGS | O | APPLICABLE FLAGS ARE:<br>- PPC (Prohibit Payload Compression) : this flag may be set on the S5/S8 and S4/S11 interfaces.<br>- vSRVCC indicator: This IE may be included by the PGW on the S5/S8 interface according to 3GPP TS 23.216 [43]. When received from S5/S8, SGW shall forward on the S11 interface.<br>- Cached Data Indicator: This IE may be included when data for this EPS bearer is serviced by a content server | BEARER FLAGS |

| CONTENT SERVER INFORMATION | C | This IE shall be present when "Cached Data Indicator" flag is set. It may include one or more of the following:<br>- Content server Address<br>- .Address of RAN/EPC node that the content server is co-located with<br>- Address of RAN/EPC node that is closest to the content server (present when content server is not co-located with any RAN/EPC node) | CONTENT SERVER INFO. |
|---|---|---|---|
| PROTOCOL CONFIGURATION OPTIONS (PCO) | O | This IE may be sent on the S5/S8 and S4/S11 interfaces. This bearer level IE takes precedence over the PCO IE in the message body if they both exist. | PCO |

FIG. 13B

| INFORMATION ELEMENTS | P | CONDITION/ COMMENT | IE TYPE | Ins. |
|---|---|---|---|---|
| CAUSE | CO | If SGW receives an Error Indication from eNodeB/RNC/S4-SGSN, the SGW shall send the Cause IE with value "Error Indication received from RNC/eNodeB/S4-SGSN" to MME/S4-SGSN as specified in 3GPP TS 23.007 [17]. | CAUSE | 0 |
| EPS BEARER ID | CO | This IE shall be included on the S11 and S4 interfaces and shall be set as follows:<br>- If the Downlink Data Notification is triggered by the arrival of downlink data packets at the SGW, the SGW shall include the EPS Bearer ID stored in the EPS bearer context of the bearer on which the downlink data packet was received;<br>- If the Downlink Data Notification is triggered by the receipt of an Error Indication from the eNodeB or RNC, the SGW shall include the EPS Bearer ID stored in the EPS bearer context of the bearer for which the Error Indication was received;<br>- If the ISR is active and the Downlink Data Notification is triggered by the arrival of control plane signaling, the SGW shall include the EPS Bearer ID present in the control plane signaling.<br>- If both the SGW and the MME/S4-SGSN support the network triggered service restoration procedure (see 3GPP TS 23.007 [17]), and if the Downlink Data Notification is triggered by the arrival of control plane signaling, the SGW shall include the EPS Bearer ID present in the control plane signaling.<br>(See 3GPP TS 23.401[3], section 5.3.4.3).<br><br>More than one IE with this type and instance values may be included to represent multiple bearers having received downlink data packets or being signaled in the received control plane message.<br>See NOTE 1. | EBI | 0 |

| | | | | |
|---|---|---|---|---|
| ALLOCATION/ RETENTION PRIORITY | CO | This IE shall be included on the S11 and S4 interfaces and shall be set as follows:<br>- If the Downlink Data Notification is triggered by the arrival of downlink data packets at the SGW, the SGW shall include the ARP stored in the EPS bearer context of the bearer on which the downlink data packet was received;<br>- If the Downlink Data Notification is triggered by the receipt of an Error Indication from the eNodeB or RNC, the SGW shall include the ARP stored in the EPS bearer context of the bearer for which the Error Indication was received.<br>- If the ISR is active and the Downlink Data Notification is triggered by the arrival of control plane signaling, the SGW shall include the ARP if present in the control plane signaling. If the ARP is not present in the control plane signaling, the SGW shall include the ARP in the stored EPS bearer context.<br>If both the SGW and the MME/S4-SGSN support the network triggered service restoration procedure (see 3GPP TS 23.007 [17]), and if the Downlink Data Notification is triggered by the arrival of control plane signaling, the SGW shall include the ARP if present in the control plane signaling. If the ARP is not present in the control plane signaling, the SGW shall include the ARP from the stored EPS bearer context.<br>(See 3GPP TS 23.401[3], section 5.3.4.3).<br>If multiple EPS Bearers IDs are reported in the message, the SGW shall include the ARP associated with the bearer with the highest priority (i.e. the lowest ARP value).<br>See NOTE 1. | ARP | 0 |
| IMSI | CO | This IE shall be included on the S11/S4 interface as part of the network triggered service restoration procedure if both the SGW and the MME/S4-SGSN support this optional feature (see 3GPP TS 23.007 [17]). | IMSI | 0 |

| CONTENTION SERVER INFORMATION | CO | The S-GW sends this information to MME when one or more EPS bearers are serviced by content server(s). It may include one or more of the following:<br>- Content server Address<br>- .Address of RAN/EPC node that the content server is co-located with<br>- Address of RAN/EPC node that is closest to the content server (present when content server is not co-located with any RAN/EPC node)<br>More than one IE with this type and instance values may be included to represent multiple bearers having serviced by local content servers. | CONTENTION SERVER INFO. | |
|---|---|---|---|---|
| PCC INFORMATION | O | The S-GW may also send charging related information for bearers that are serviced by the content servers that are closest to the eNB. | PCC INFO. | |
| PRIVATE EXTENSION | O | | PRIVATE EXTENSION | VS |
| NOTE 1: The usage of this parameter at the S4-SGSN is not specified in this release. | | | | |

FIG. 14C

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE TYPE | M | | 9.2.1.1 | | YES | REJECT |
| MME WTRU S1AP ID | M | | 9.2.3.3 | | YES | REJECT |
| eNB WTRU S1AP ID | M | | 9.2.3.4 | | YES | REJECT |
| WTRU Aggregate Maximum Bit Rate | O | | 9.2.1.20 | | YES | REJECT |
| E-RAB to be Setup List | | 1 | | | YES | REJECT |
| >E-RAB To Be Setup Item IEs | | 1 to <maxnoof E-RABs> | | | EACH | REJECT |
| >>E-RAB ID | M | | 9.2.1.2 | | | |
| >>E-RAB Level QoS Parameters | M | | 9.2.1.15 | Includes necessary QoS parameters | | |
| >>Transport Layer Address | M | | 9.2.1.1 | | | |
| >>GTP-TEID | M | | 9.2.2.2 | EPIC TEID | | |
| >>NAS-PDU | M | | 9.2.3.5 | | | |
| >>Correlation ID | O | | 9.2.2.80 | | YES | IGNORE |
| >> Content Server Info | O | | | | | |
| >> Content Server Address | M | | | | | |
| >>>Co-located with the eNB | O | | | Flag to indicate if the content server is co-located with the eNB | | |
| >>> Closest Node Address | O | | | Address of RAN/EPC node that the content server is co-located with | | |
| >> PCC Information | O | | | Policy enforcement and charging related information for bearers that are serviced by the content servers that are closest to the eNB. | | |

FIG. 15

METHOD AND APPARATUS FOR LOCAL DATA CACHING

CROSS REFERENCE TO RELATED APPLICATIONS

This application claims the benefit of U.S. provisional application No. 61/473,023, filed Apr. 7, 2011, and PCT application No. PCT/US2012/032549, filed Apr. 6, 2012, the contents of which are hereby incorporated by reference.

FIELD OF THE INVENTION

This application is related to wireless communications.

BACKGROUND

In order to further improve achievable throughput and coverage of Long Term Evolution (LTE)-based radio access systems, LTE-Advanced (LTE-A) may include carrier aggregation (CA) and support of flexible bandwidth arrangement feature. This may allow downlink (DL) and uplink (UL) transmission bandwidths to exceed 20 MHz in Release 8 (R8) LTE, (e.g., 40 MHz or even up to 100 MHz). In LTE Release 10 (R10), component carriers (CC) were introduced to enable the spectrum aggregation feature. Different component carriers may have different coverages.

SUMMARY

Methods and apparatus for local data caching are disclosed. Data may be stored in a local data storage connected to a base station or network nodes. The data flow may be split. The base station may coordinate with a cooperating base station for split-data transmission of locally cached data. Data may be split at different layers.

BRIEF DESCRIPTION OF THE DRAWINGS

A more detailed understanding may be had from the following description, given by way of example in conjunction with the accompanying drawings wherein:

FIG. 12 is an example table for information elements (IEs) in a Create Bearer Request;

FIGS. 13A and 13B are an example table for bearer context within Create Bearer Request;

FIGS. 14A, 14B and 14C are an example table for IEs in a Downlink Data Notification; and FIG. 15 is an example table for IE in an evolved packet system (EPS) Bearer Setup.

DETAILED DESCRIPTION

Figure 1A:
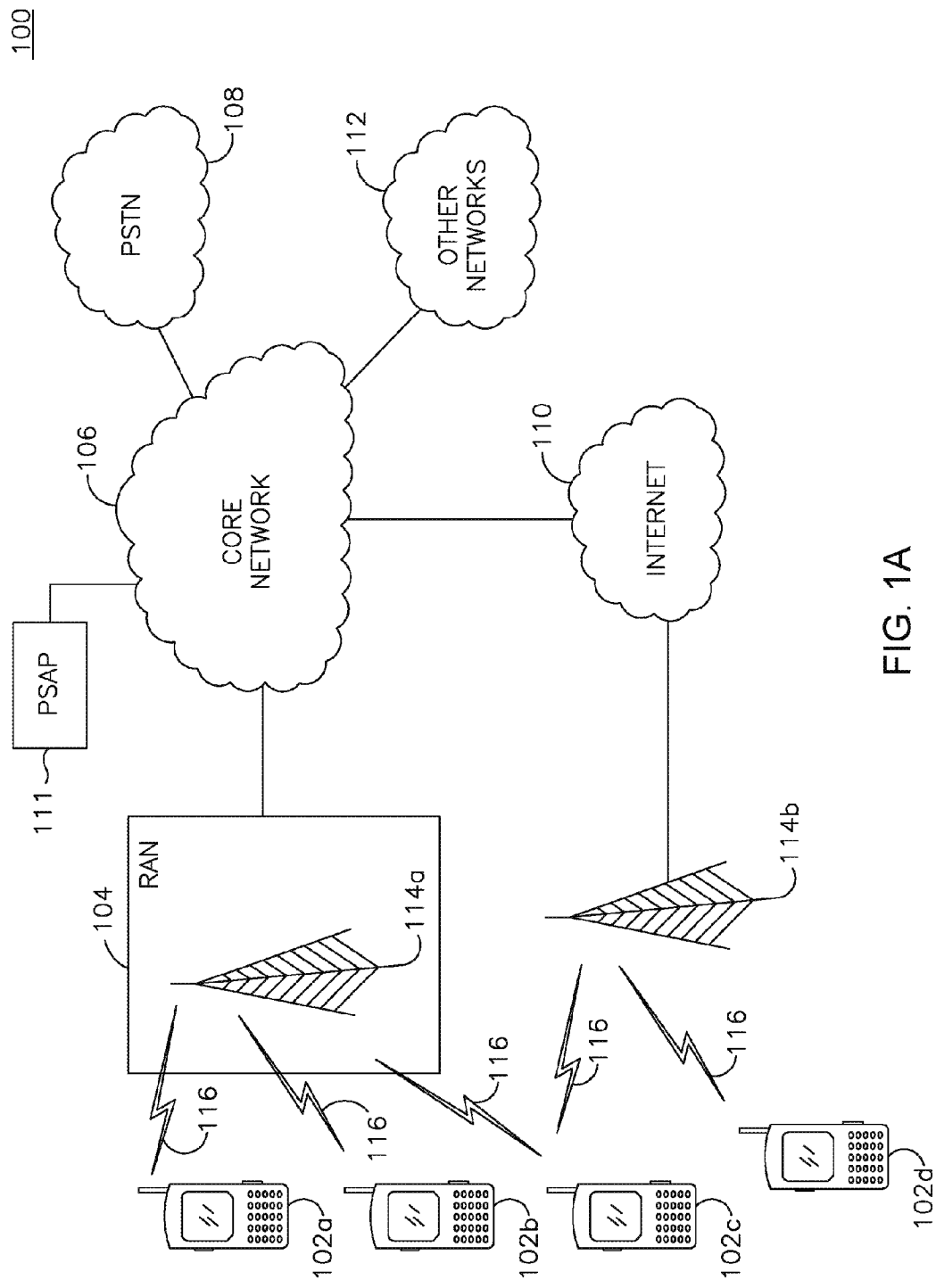
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNodeB, a Home Node B, a Home eNodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
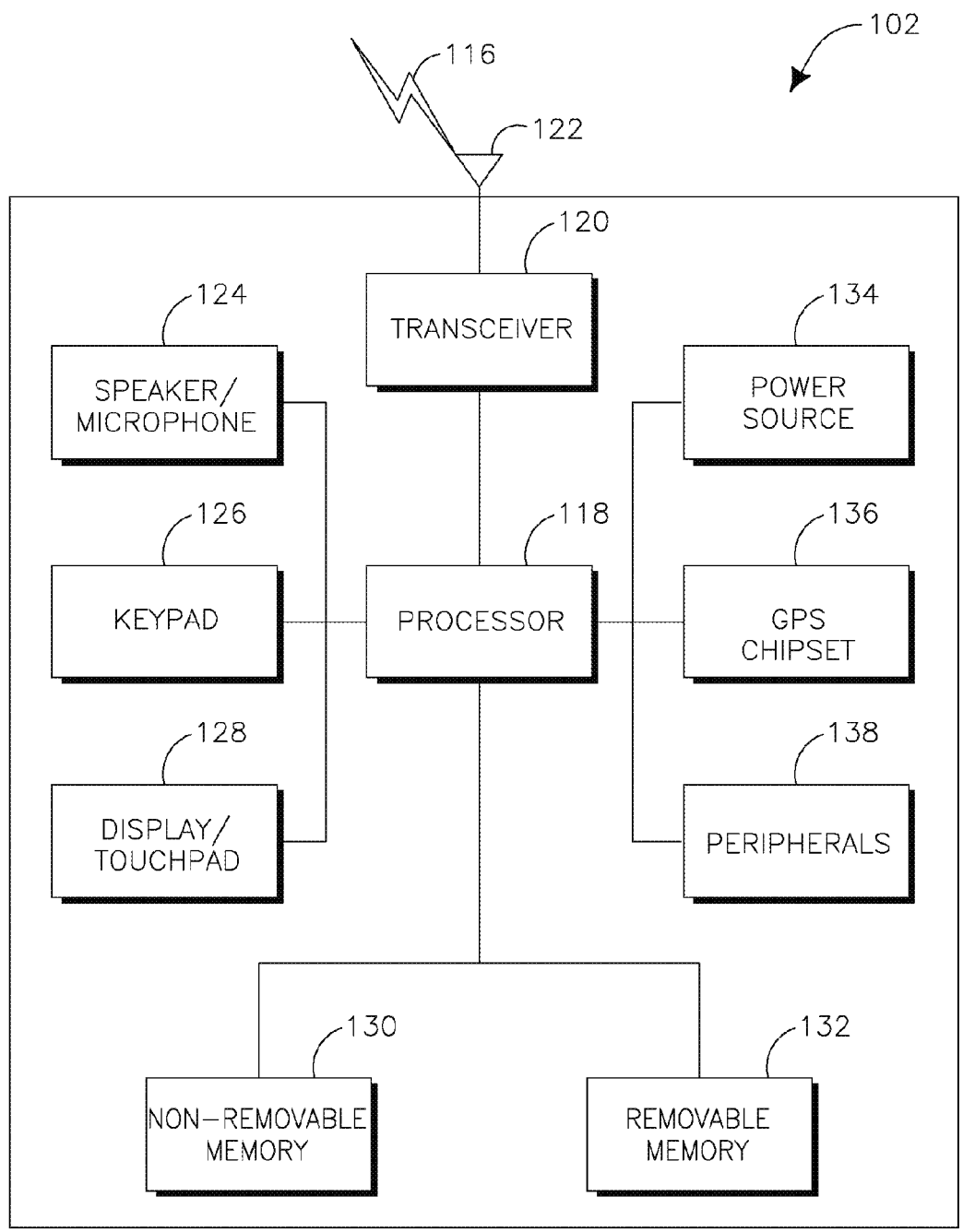
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
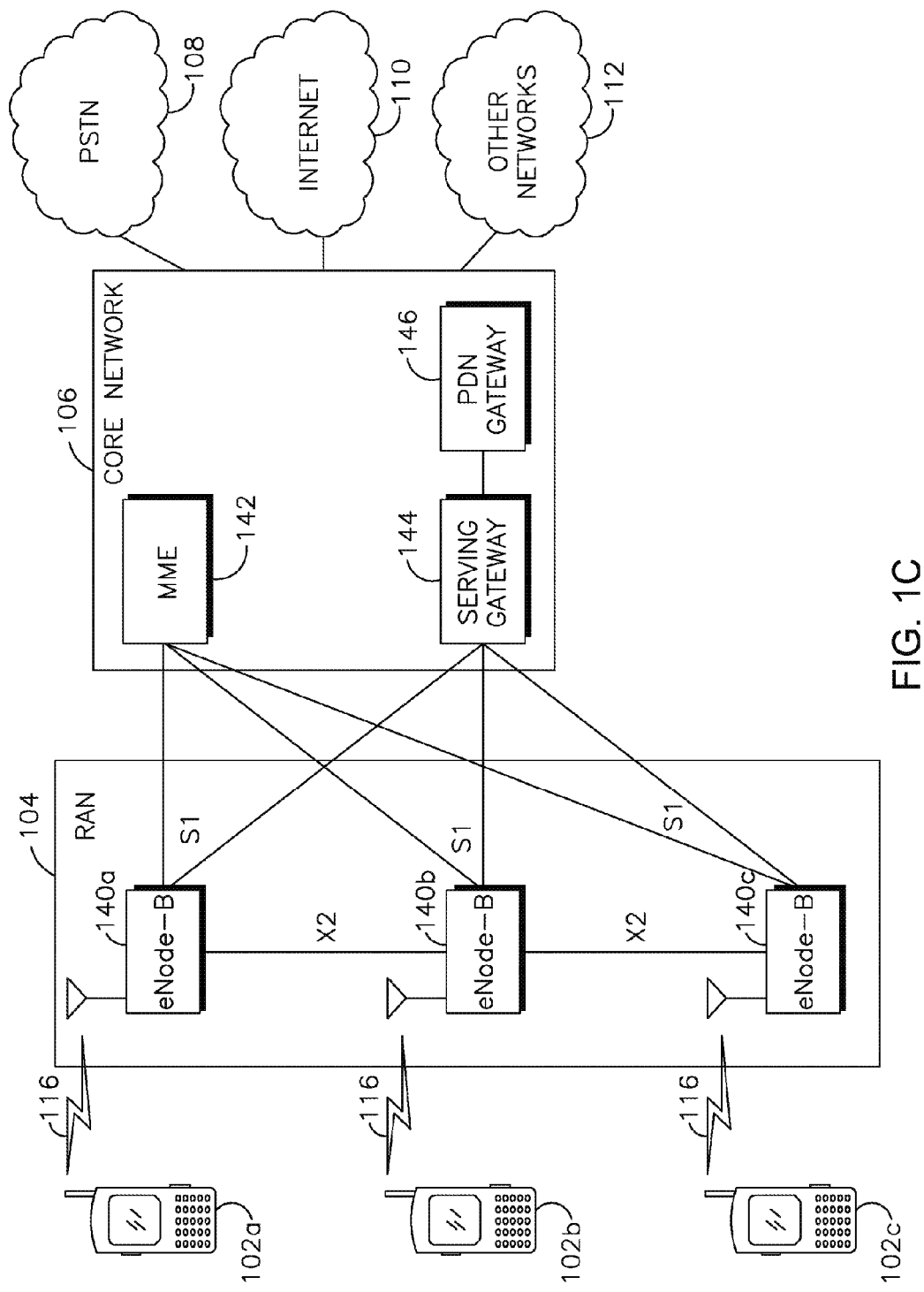
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNodeBs 140a, 140b, 140c, though it will be appreciated that the RAN 104 may include any number of eNodeBs while remaining consistent with an embodiment. The eNodeBs 140a, 140b, 140c may each include one or more transceivers for communicating with the WTRUs 102a, 102b, 102c over the air interface 116. In one embodiment, the eNodeBs 140a, 140b, 140c may implement MIMO technology. Thus, the eNodeB 140a, for example, may use multiple antennas to transmit wireless signals to, and receive wireless signals from, the WTRU 102a.

Each of the eNodeBs 140a, 140b, 140c may be associated with a particular cell (not shown) and may be configured to handle radio resource management decisions, handover decisions, scheduling of users in the uplink and/or downlink, and the like. As shown in FIG. 1C, the eNodeBs 140a, 140b, 140c may communicate with one another over an X2 interface.

The core network 106 shown in FIG. 1C may include a mobility management entity or mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNodeBs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNodeBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNodeB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Described herein are methods and apparatus for enabling multi-flow and multi-site data flow with virtual data flow and split of data payload available at the base station, (i.e., an eNodeB), or network nodes such as gateways, using component carrier cooperation (CCC) to increase the cell-edge user data throughput. These methods and apparatus may also enable scenarios where edge-caching is performed within an operator's domain with no virtual data flow-split.

The methods and apparatus also address procedures to setup virtual data flow and maintain data-split service of System Architecture Evolution (SAE) bearer in the radio access network (RAN). For example, this may include a radio aware Inter-Working Flow Control (IWFC) entity that provides cross layer coordination of cache data formatting and transmission rate to source internet protocol (IP) layer, procedures to adjust the cooperating site transmission rate for WTRUs by controlling cache data sourcing rate, and interface, (e.g., S1AP, X2AP, and radio resource control (RRC)), modification required to configure a multi-site data flow using edge-cached data. It may further include system architecture for attaching external storage data device to the base station for data caching.

The methods and apparatus may further provide solutions and procedural updates for RAN, non-access stratum (NAS) and evolved packet core (EPC) nodes to enable edge-caching where no virtual data flow split is used. This may, for example, include: determination of the local cache where the data is cached, (also known as content server nodes); procedural updates and solutions on how the cellular network uses this information to modify/update the RAN and EPC nodes to enable edge-caching; enhancements for billing support for the services that are serviced locally by the cached content servers; enhancements for policy enforcement support for the services that are serviced locally by the cached content server nodes; and support for data routing services that are serviced locally by the cached content servers.

In general, the methods and apparatus may address the RAN procedures for enhancing setting up and maintaining a radio bearer service that specifies a storage device in the network, (such as the base station or gateway), as the source of data payload for downlink (DL) data split or handover. It may also cover RAN, NAS and EPC core procedures where edge-caching is performed within an operator's domain with no virtual data flow-split.

There may be substantial cell edge throughput gain by supporting fuzzy cell deployment. In order to make full utilization of available bandwidth on each component carrier, corresponding data stream may be routed to/from associated base station.

The explosive growth in total data delivery is straining both the wired and wireless parts of operators' networks. Video delivery in these cellular networks makes up a large fraction of total traffic and is growing. The explosive growth in video in particular makes the idea of cashing video data at or near the edge of the network attractive as these files tend to be large, but smaller in number than other traffic. This combined with the dramatically declining costs of data storage makes video caching in the base station feasible and economic.

Figure 2:
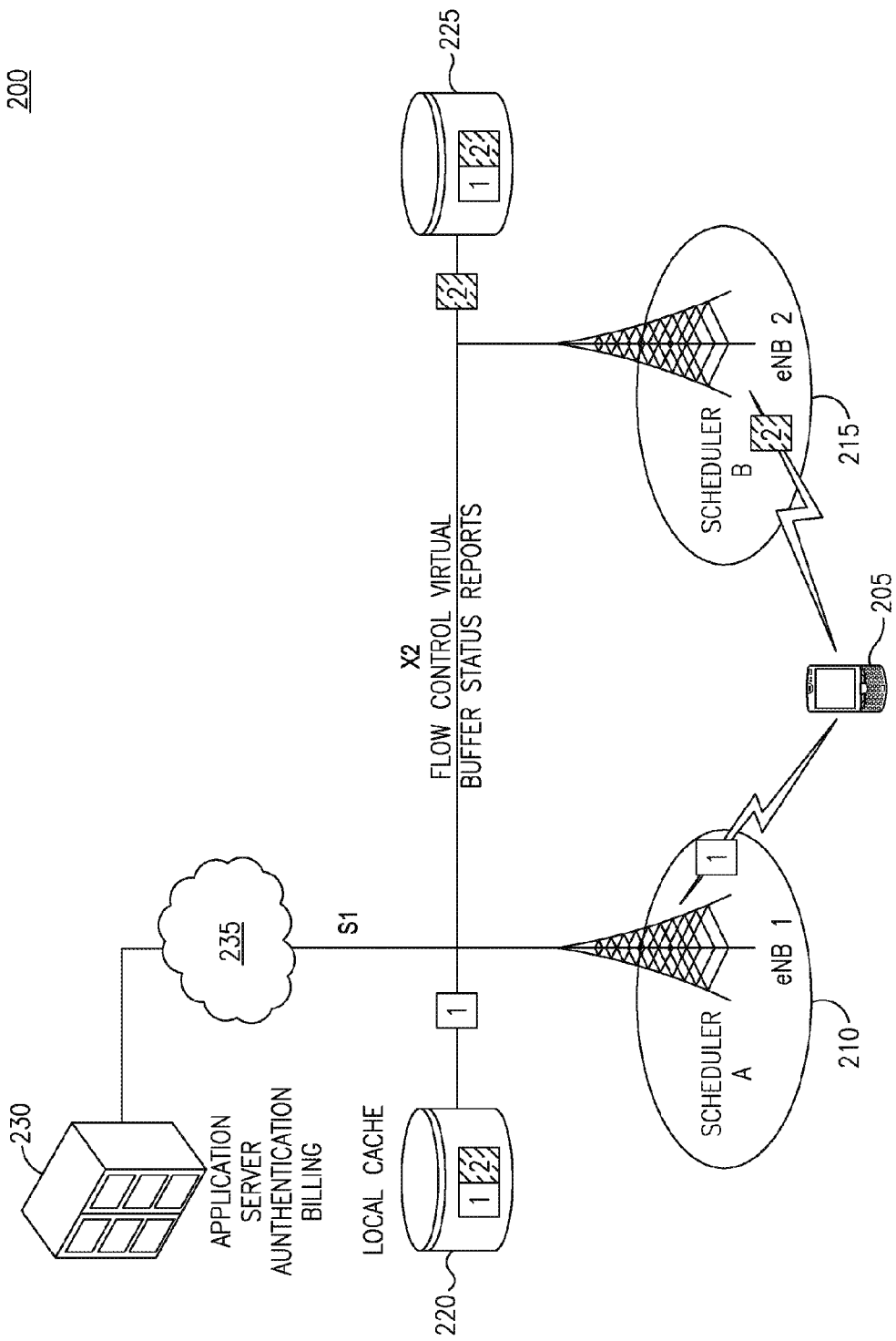
FIG. 2 shows an example caching scheme used to decrease backhaul loading wherein content is cashed in base stations in a system supporting multi-flow/multi-site transmission.

Multi-flow transmission may be used to extend the benefits of the caching schemes by enabling better network load balancing, better cell-edge performance, and better resource utilization. FIG. 2 illustrates an example caching scheme architecture and system 200 used to decrease backhaul loading wherein contents are cached in base stations in a system supporting multi-flow transmissions. System 200 includes, but is not limited to, a WTRU 205 that is in communications with a base station 210, (for example eNB 1), having a scheduler A and a base station 215, (for example eNB 2), having a scheduler B. Each base station 210 and 215 may have a local cache 220 and 225, respectively. The system 200 may also include an application server/authentication/billing entity 230 connected to the base stations 210 and 215 connected via a core network 235.

The local caches 220 and 225 store provide content caching for each base station 210 and 215, respectively, and may allow the base stations 210 and 215 to get access to data payload directly without going through the backhaul, i.e., the S1 signaling interface (also know as S1 application protocol (S1AP)) nor the X2 signaling interface (also known as the X2 application protocol (X2AP), where applicable, need to be used to access the data payload. For example, selected popular/frequently downloaded big files, (such as a YouTube® video clip or a Netflix® steaming video content), may be stored in the local caches 220 and 225 either during user downloads or proactively when network utilization is low, (for example, 3-6 am). Base stations 210 and 215 may then get transmissions from the local caches 220 and 225 when accessing this content. These multi-site transmissions from the local caches, for example local cache 220 and 225, may be referred to as "Virtual Data-Flow Split" (VDFS).

The "1" and "2" identifiers at each of the local caches 220 and 225 indicate or signify the data flows present at the local caches 220 and 225, respectively. For example, the stored data may be the same data but stored at different locations, (i.e., replicate data storage), or may be different parts of the data that are stored at different locations. The WTRU may combine data flow "1" and "2" to get an increase in data reception quality if both flows carry the same data or increase in data rate if both flows carry different data.

The example system 200 and other variations thereof address the lack of a cipher key at a cooperating base station, lack of multi-flow control mechanism for the cached data, lack of multi-flow control mechanism for base stations with and without cached data, lack of a mechanism for a primary base station to know if candidate cooperating base stations have the required data cached, and lack of verification of data cache availability at handover target base station.

The 3rd Generation Partnership Project (3GPP) may have a Policy Control and Charging (PCC) function that may allow customization of the PCC rules such that based on application and subscriber profile, radio bearer resources are granted for the service requested. Based on the PCC rule, a core network (CN) entity, the Policy Charging and Enforcement Function (PCEF), maps the requested application service into the expected service rate and Quality of Service (QoS), configures a radio access network (RAN) with an appropriate radio bearer service, (i.e., evolved radio access bearer (E-RAB)), and provides an IP address of the serving gateway (S-GW) where the user IP packet is provided. The RAN is responsible for assigning appropriate radio resources to satisfy the transferring of requested service rate and QoS. The example embodiments described herein address the lack of a signaling mechanism to configure base stations to use data caches instead of gateway nodes.

The example embodiments are described with reference to the LTE-A system architecture but are also applicable to any wireless communication system including, but not limited to, High Speed Packet Access (HSPA). In case of HSPA, the eNodeB is replaced by the radio network controller (RNC) or Node-B, and the changes applicable to the S1AP correspond to radio access network application part (RANAP) and the changes applicable to X2AP correspond to radio network subsystem application part (RNSAP) or Node-B application part (NBAP).

Figure 3:
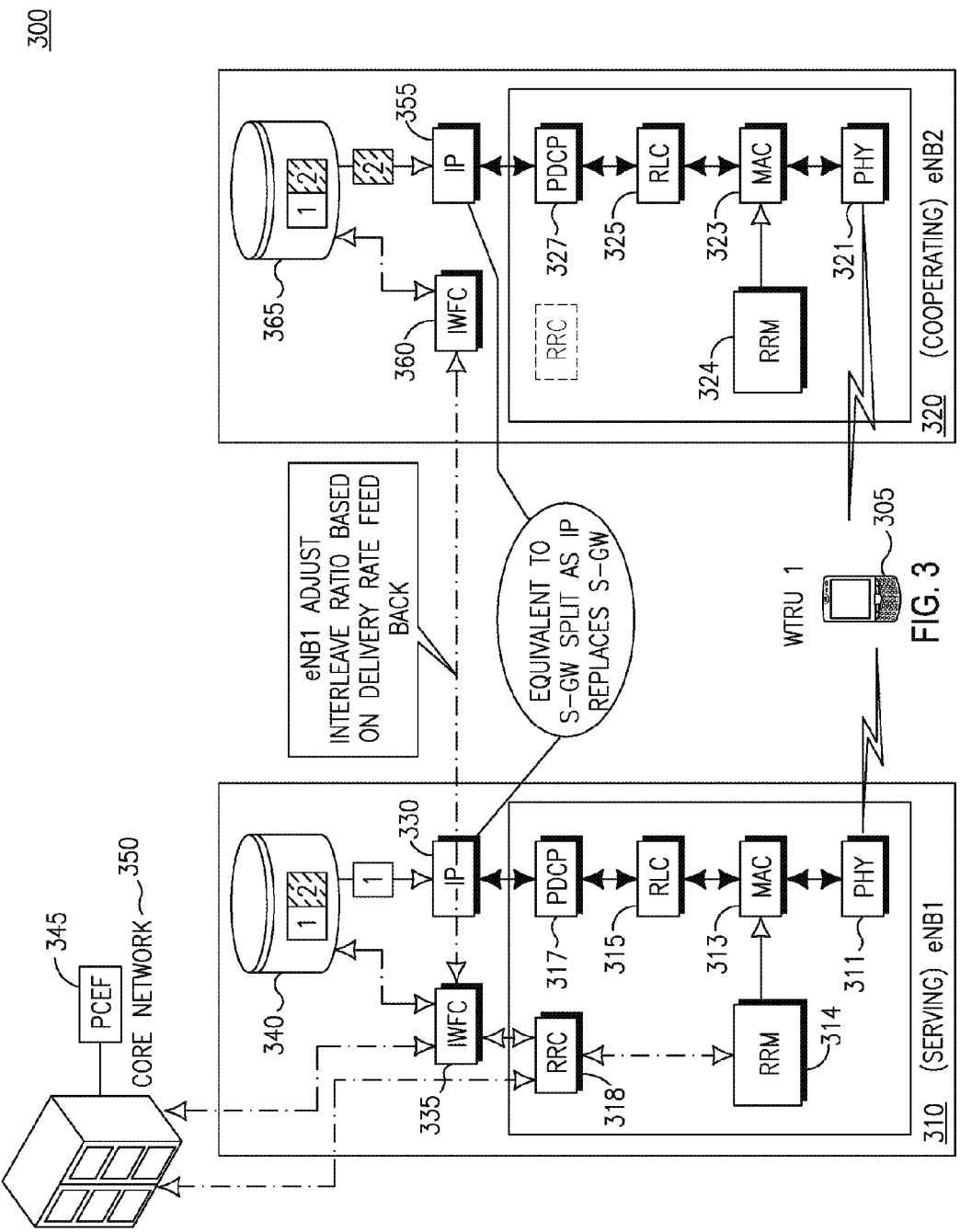
FIG. 3 is an example system architecture of multi-flow/multi-site transmission supporting virtual data-flow splitting of cached data.

Described herein is user-plane data-splitting at the serving gateway with respect to FIG. 3. FIG. 3 is example system architecture 300 of multi-flow/multi-site transmission supporting virtual data-flow splitting of cached data, where the dashed connections represent control signaling flow and the solid connections represent data flow. The system 300 may include at least a WTRU 305 in communication with a serving or primary base station 310, (for example, eNB 1), and a cooperating base station 320, (for example, eNB 2). The serving base station 310 includes at least a physical (PHY) layer/entity 311 connected to a medium access (MAC) layer/entity 313, which in turn is connected to a radio link control (RLC) layer/entity 315 and which in turn is connected to a Packet Data Convergence Protocol (PDCP) layer/entity 317. A radio resource manager (RRM) entity 314 is connected to the MAC layer/entity 313 and is also connected to a radio resource controller (RRC) 318. The cooperating base station 320 includes at least a physical (PHY) layer/entity 321 connected a medium access (MAC) layer/entity 323, which in turn is connected to a radio link control (RLC) layer/entity 325 and which in turn is connected to a Packet Data Convergence Protocol (PDCP) layer/entity 327. A radio resource manager (RRM) entity 324 is connected to the MAC layer/entity 323.

The PDCP 317 of the serving base station 310 is in data flow communications with an Internet Protocol (IP) entity 330 and the RRC 318 is in control signaling flow with an Inter-Working Flow Control (IWFC) entity 335, both of which, in turn, are in data flow and control signaling flow communications, respectively, with a local cache 340. The RRC 318 and the IWFC 335 are in control signal communications with a PCEF entity 345 in a CN 350. The IP entity 330 and IWFC 335 are both located in the base station 310.

The PDCP 327 of the cooperating base station 320 is in data flow communications with an Internet Protocol (IP) entity 355 and the IWFC 335 is in control signaling flow communications with IWFC 360. The IP entity 355 and IWFC 360 are in data flow and control signaling flow communications, respectively, with a local cache 365. The IP entity 355 and IWFC 360 are both located in the base station 320. For each WTRU utilizing VDFS, a WTRU may be associated with multiple base stations in a CCC. However, only the RRC on the primary base station makes assignment decisions on radio resources from a cooperating base station via the resource usage feedback on X2 link, which provides CCC specific radio resource control support. A base station may support multiple WTRU VDFS services either as a primary base station with an active RRC for WTRU A or as a cooperating base station providing resource usage feedback in support of a primary base station operation for WTRU B.

The location of the IP entity and introduction of the IWFC entity enable multi-flow transmission. In general, the feature and interfaces in the evolved UMTS terrestrial radio access (E-UTRA) may be maintained with changes to add new information elements (IE) to the existing messages in order to configure and monitor the caching data on the control plane. On the data plane, the data flow on the backhaul, (S1 and X2), may be replaced by the local cache (storage) access. The details of interface changes are described herein below. The illustrated architecture matches a multi-flow S-GW data split architecture. However, a RAN data-split option may support this architecture. An alternative VDFS is further described herein where multi-site transmission includes a site that does not support caching.

Described herein is VDSF with mixed caching. The maximum benefit in relieving the backhaul loading on S1 and/or X2 interfaces for multi-site transmissions may be provided when caching is available for each base station. In the case when one of the sites does not have caching capability, the backhaul saving may still be achieved either on S1 or X2 as illustrated for example in FIG. 4, which illustrates VDSF with cooperating site caching, and in FIG. 5, which illustrates VDSF with primary site caching. The cooperating site caching may eliminate the data traffic load on X2 while primary site caching may eliminate the data traffic load on S1 interface. There is, in general, one primary base station per WTRU but each base station providing an active data link to the WTRU is considered a serving base station. For clarity, the term cooperating is used to identify a non-primary base station that has an active data link to the WTRU.

Figure 4:
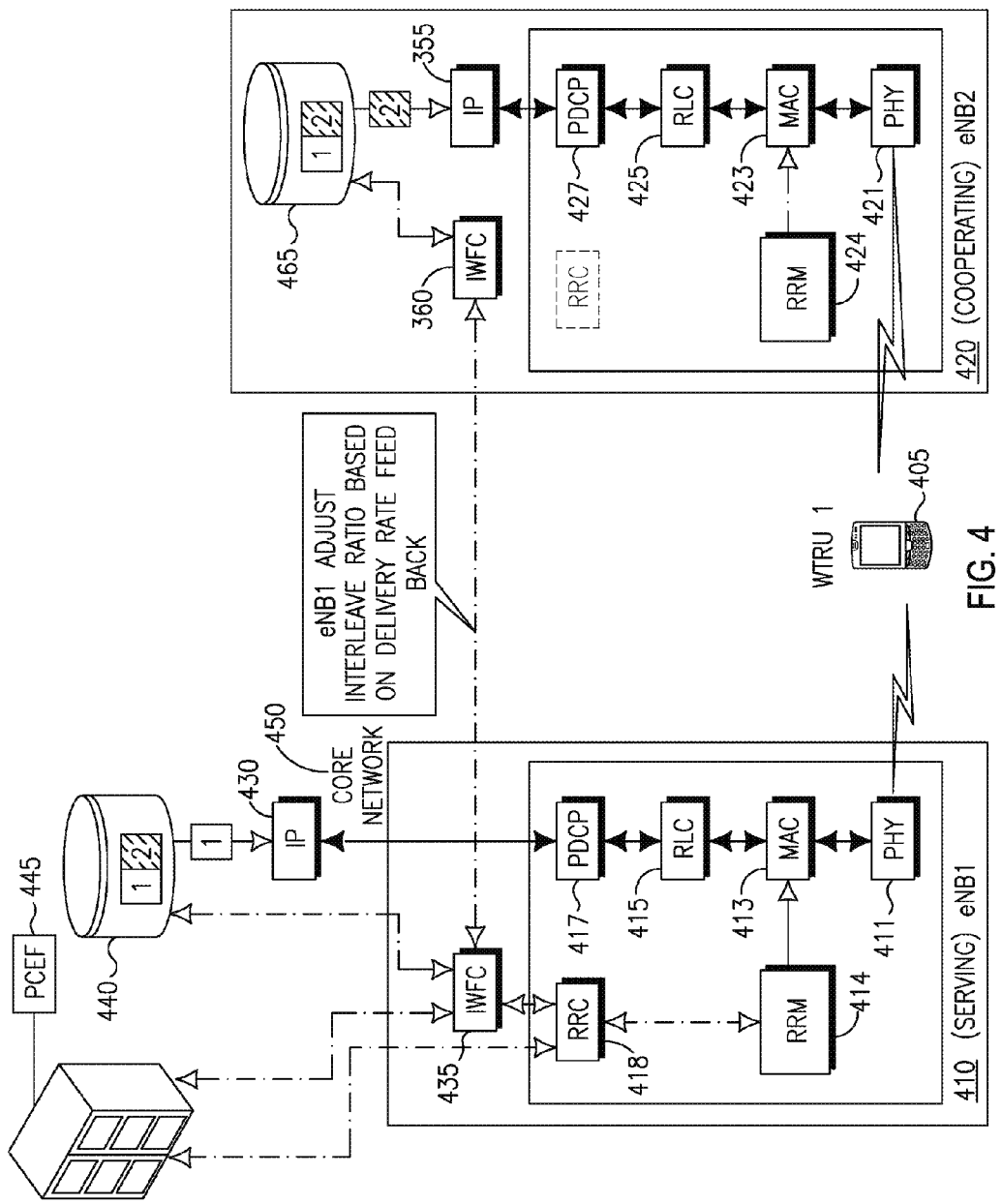
FIG. 4 shows an example virtual data flow splitting (VDFS) with cooperative site caching.

FIG. 4 illustrates an example VDSF system 400 that supports multi-flow/multi-site transmission supporting virtual data-flow splitting of cached data, where the dashed connections represent control signaling flow and the solid connections represent data flow. The system 400 may include at least a WTRU 405 in communication with primary base station 410, (for example, eNB 1), and a cooperating base station 420, (for example, eNB 2). The primary base station 410 includes at least a physical (PHY) layer/entity 411 connected to a medium access (MAC) layer/entity 413, which in turn is connected to a radio link control (RLC) layer/entity 415 and which in turn is connected to a Packet Data Convergence Protocol (PDCP) layer/entity 417. A radio resource manager (RRM) entity 414 is connected to the MAC layer/entity 413 and is also connected to a radio resource controller (RRC) 418. The cooperating base station 420 includes at least a physical (PHY) layer/entity 421 connected a medium access (MAC) layer/entity 423, which in turn is connected to a radio link control (RLC) layer/entity 425 and which in turn is connected to a Packet Data Convergence Protocol (PDCP) layer/entity 427. A radio resource manager (RRM) entity 424 is connected to the MAC layer/entity 423.

The PDCP 417 of the primary base station 410 is in data flow communications with IP entity 430 located in a CN 450 and the RRC 418 is in control signaling flow with an IWFC entity 435, both of which, in turn, are in data flow and control signaling flow communications, respectively, with a local cache 440 located in the CN 450. The RRC 418 and the IWFC 435 are in control signal communications with a PCEF entity 445 in the CN 450.

The PDCP 427 of the cooperating base station 420 is in data flow communications with the IP entity 455 and the IWFC 435 is in control signaling flow communications with IWFC 460. The IP entity 455 and IWFC 460 are in data flow and control signaling flow communications, respectively, with a local cache 465. While the cost of local caching equipment is expected to decrease significantly, FIG. 4 and CN caching offer an alternative to installing caching equipment on every base station. The trade-off is the cost of installing a local cache per site versus traffic load on the backhaul as described herein with respect to VDFS with mixed caching.

Figure 5:
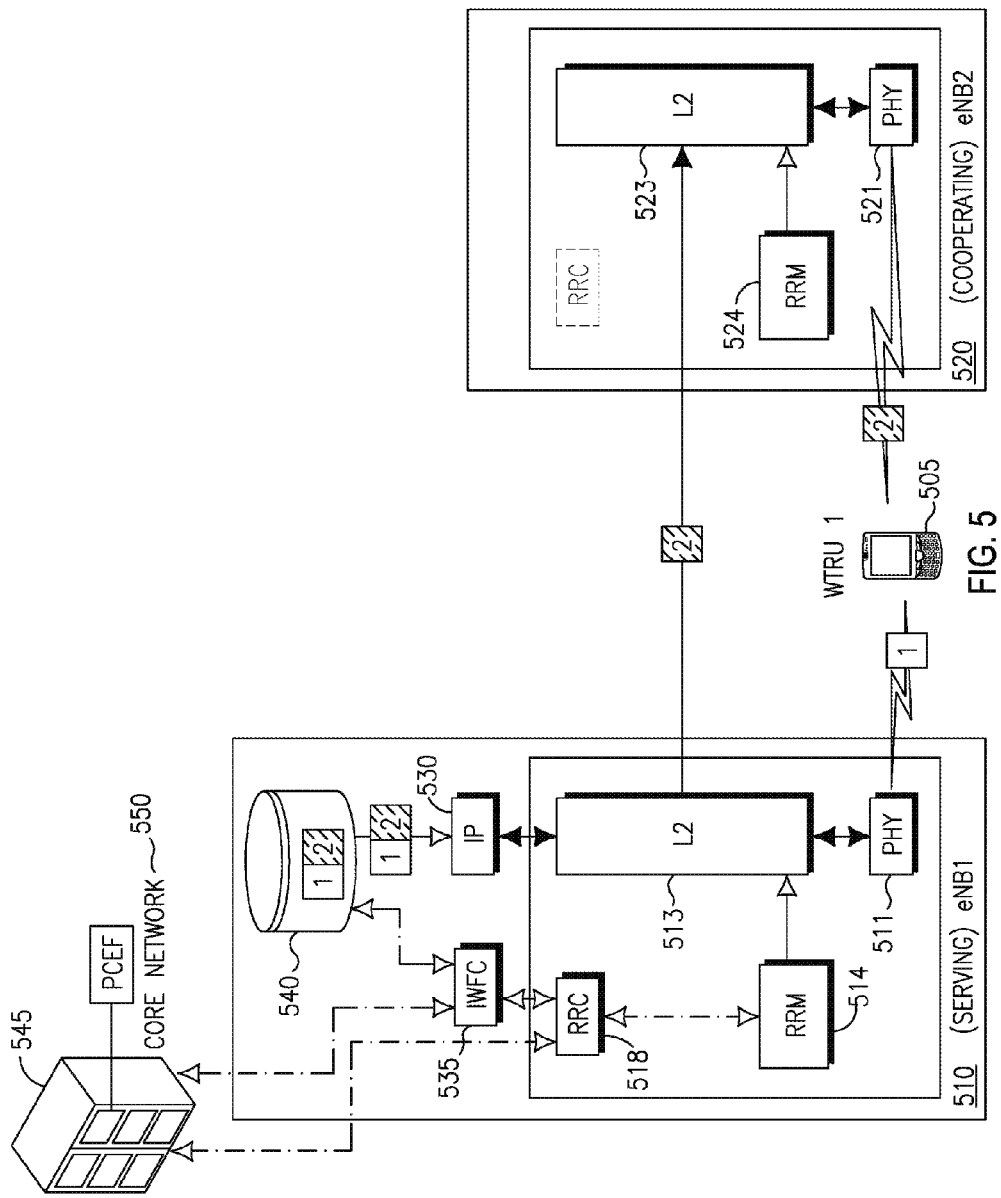
FIG. 5 shows an example VDFS with primary site caching.

FIG. 5 illustrates an example VDSF system 500 that supports multi-flow/multi-site transmission supporting virtual data-flow splitting of cached data, where the dashed connections represent control signaling flow and the solid connections represent data flow. The system 500 may include at least a WTRU 505 in communication with a serving or primary base station 510, (for example, eNB 1), and a cooperating base station 520, (for example, eNB2). The serving base station 510 includes at least a physical (PHY) layer/entity 511 connected to a layer 2 entity 513. A radio resource manager (RRM) entity 514 is connected to the layer 2 entity 513 and is also connected to a radio resource controller (RRC) 518. The cooperating base station 520 includes at least a physical (PHY) layer/entity 521 connected to a layer 2 entity 523. A radio resource manager (RRM) entity 524 is connected to the layer 2 entity 523. The layer 2 entity 517 of the serving base station 510 is in data flow communications with IP entity 530 and the RRC 518 is in control signaling flow with an IWFC entity 535, both of which, in turn, are in data flow and control signaling flow communications, respectively, with a local cache 540. The RRC 518 and the IWFC 535 are in control signal communications with a PCEF entity 545 in the CN 550. The layer 2 entity 517 of the cooperating base station 520 is in data flow communications with the layer 2 entity 513.

Described herein is user-plane data-splitting at a RAN. Referring back to FIG. 3, a protocol stack is shown that is compatible with secure gateway (S-GW) data split in the CN or PDCP data-split in the RAN. In either case, a security key may be assigned for data ciphering. In this case, a different security key may be assigned to each site. That is, each cooperating transmission site needs to know the assigned security key per WTRU for data flow encoding. Alternatively, the same security key may be assigned to all sites, but each site may transmit using a distinct PDCP sequence number (SN) pattern. For example, in case of a two site transmission, a primary site may transmit using odd numbers and a cooperating site may use even numbers.

Cooperating sites may feedback the total amount of data delivered for the reporting duration, (may be periodic or on request), (e.g., in unit of bytes). In case of a S-GW/PDCP split, the reported data count may be IP/PDCP data payload. In case of a RLC split, the reported data count may be PDCP packet data unit (PDU). In case of MAC split, the reported data count may be RLC PDU.

This feedback information may be used to determine the IP transmission rate of virtual data-split from all cooperating sites. The IWFC entity on the primary site may collect the data delivered by each site for a configured time period and compare against the reported individual site loading to determine the new transmission rate to signal the IWFC entity.

The transmission rate may be a predetermined ratio or specified number. For example, the ratio may be one of a predefined list of delivery ratio such as 1:9, 2:8, 3:7, 4:6, and the like, along with configuration of a target rate. The specified number may be a specific rate of N kBps, or 10% of target rate, and the like.

Described herein are example embodiments for handling for the specified configurations. In the case of RAN data-splitting in the MAC or RLC entity, a common higher layer, (i.e., one PDCP entity in case of RLC split, or one RLC entity in case of MAC split) may be assumed. This is compatible with alternative VDFS as illustrated in FIG. 5 but does not match the architecture as illustrated in FIGS. 3 and 4.

The protocol stack, in this case, may be modified for a multi-site data flow that implements data-split at the RLC or below, (e.g., MAC), on the cooperating sites to support all VDFS configuration. The cooperating sites may enable PDCP layer on the same site to provide split sub-flows instead of receiving sub-flows from the primary site. The security key assignment requirement may be the same as the S-GW data split. The reported data count may be mapped back to IP/PDCP for split ratio adjustment.

An IWFC entity is the functional entity that coordinates the fetching of cached data, (i.e., from content servers), using radio environment feedback and feedback regarding data delivery statistics. The radio status collected by the cooperating sites or WTRU may be provided to the primary site and then provided to the IWFC entity in terms of available capacity and per site radio quality, (e.g., reference signal received quality (RSRQ)).

The IWFC entity may perform one or more of the following functions. For example, the IWFC entity in the primary site may determine the current site transmission rate using the reported amount of delivered data to a WTRU. This WTRU data delivery rate may be the data from an active cached data session during the reporting period or in the case of initiating a new session from an earlier session by any WTRU or the same WTRU, if available.

In another example, the IWFC may determine the predicted site transmission rate, for example, by adding a configured percentage of available radio capacity, for example, by Operation and Maintenance (O&M) interface or preset configuration.

In another example, the IWFC may pre-configure in each base station (or by O&M), data fetching patterns with cached data expecting certain ratios of average data skipped. The inverse of each pattern may also be a valid pattern to accommodate any base station pairing for VDFS. VDFS may be done with N base stations. For each ratio assigned to the N base stations, the fetching patterns may contain no overlaps but taken together after all data is sent.

In another example, the IWFC on the primary site may signal via the X2 interface the predicted site transmission rate to the IWFC entity on a cooperating site as one input used to configure the data fetching pattern to source the cache data for the IP layer on the same site.

The IWFC entity in the primary base station may distribute the fetching pattern index, (or equivalently the average skipped data ratio), and the aggregate average transmission rate, (or equivalently, each base station's average transmission rate).

The IWFC entity in the primary base station may distribute a target maximum deviation from the target transmission rate, indicating to the base stations the target permissible short term mismatch between the data flow rates from each base station.

The IWFC entity in the cooperating base stations may signal the IWFC entity in the primary base station when it has, expects to, or requests that the transmission rate be adjusted (up or down).

The IWFC entity in the primary base station may monitor the actual delivery rate and IWFC messages from the cooperating base station and make corrections to the flow rates to maintain uniform delivery.

The IWFC entity in the primary base station may indicate the timing information, (or alternative way to index to the file segment/or payload memory), for when any changes in the fetching pattern are made. A default index into the fetching pattern may be used upon a change of pattern unless such index is also signaled.

The IWFC entity in the primary base station may also signal to the cooperating base stations which layers of a scalable video codec (SVC) video to transmit. In this case, there may be no fetching pattern or the fetching pattern applies to video layers that are subject to transmission from multiple base stations. In case of video, fetching patterns may apply to whole video frames rather than units of bits.

If channel conditions do not support the desired rate, the IWFC entity may choose to transmit a video frame of lower quality and lower data rate, but has the same overall rate in terms of the video view rate, (e.g., if channel quality is lowered, the IWFC entity may decide to transmit frames with ½ of the bits at ½ of the rate thus maintain the same view rate).

In case of SVC, as the average available rate at multiple base stations change and is learned by the primary IWFC entity via corresponding messages, the primary IWFC entity may signal changes in rates, fetching patterns and SVC layers each cooperating base station uses.

In addition to the transmission rate, the radio transmission quality and congestion may be used in the use case of video streaming to provide another dimension of data transfer optimization. Video streaming may be optimized using SVC. The IWFC entity on the primary site may take further optimization by examining if there is a significant difference in the RSRQ or overall delivery rates between different sites. If the RSRQ or deliverable rate deviates above a configurable threshold, the IWFC entity may instruct the cooperating site to transmit lower class video frames from sites with a lower RSRQ or delivery rates and base class frame on sites with a higher RSRQ or delivery rates.

An RAN is aware of the service type of the call from the Quality of Service (QoS) Class Identifier (QCI) configured during the call setup. The primary site IWFC entity has an access to this information in the WTRU context stored on the base station. If the service type is not of live streaming (QCI 7), the IWFC entity may choose to request each site to transfer segments of a file.

The IWFC entity may choose between the following two IP data sourcing configuration types: frame interleaving or file segmentation. Frame interleaving is compatible with streaming files such as video clips or movies. This method works better with service types that do not warrant IP level error retransmission. In the case of video, service may be improved by using SVC in conjunction. File segmentation is compatible with large files such as video file downloads, executable programs, electronic books, or the like. This method allows simpler IP level retransmission scheme in case of link failure from a site.

IWFC may use a L2 protocol stack buffer status report, if available, to initiate IP transfer rate adjustment. For example, IWFC may monitor the buffer change rate and compare against a configured threshold to decide if IP transfer rate should be adjusted for any specific site.

The IWFC entity may provide information required to determine the service charging back to the CN PCFE on call termination since the S-GW may not be present in the case of VSDF to provide service delivery information as illustrated in FIG. 3. In the case of handover (HO) to a new target base station, the IWFC may have to initiate verification on availability of the desired data caching at the HO target destination. This is described herein below.

Described herein is processing of unequal site delivery rates. The delivery rate of individual radio links from each site changes dynamically as a combined result of changing factors such as WTRU distance to the base station, speed of WTRU, interference from other wireless devices, and the like. The scheduler in the base station of individual sites manages the data traffic load in the base station transmit buffer and informs a higher layer to adjust the rate of data traffic to maintain the traffic load in the buffer within some threshold of the targeted rate.

Adjusting higher layer rate is sufficient for VDFS to manage dynamic radio capacity when individual sites have a full duplicate copy of requested application content to be delivered. In the case where individual sites only have partial application content available on a site, the available data content in the cache of a site may be delivered faster than available cached data on other sites. When all available cache data on a site is delivered, the traffic delivery rate on a single site may fall down to zero while the other sites may continue to deliver data. This may happen if a particular site has less data of interest cached than the other cooperating site or if delivery rate from one site is much greater than another cooperating site, resulting in completion of available content delivery much faster. In either case, the primary IWFC will detect the depletion of a transmit buffer at a site. At the detection of zero transmit buffer at a site, the IWFC shall inform data storage layer on other cooperating sites with the following information via IWFC of the respective base station: IP address of base station with available delivery bandwidth (data split pattern); and IP address of other cooperating base stations.

The application data storage management in the higher layer on the other cooperating base stations shall use the IP address to establish a connection with data storage management entities to coordinate the remaining data content to be delivered and send the data content directly to the IP address of the base station with available bandwidth to resume the data delivery.

Alternatively, the IP address of all active base station may be provided upon request or during setup by a more advanced application data storage management system to enable the management system to actively cache additional content in advance to avoid exhaustion of content of interest in the data storage.

Described herein is call service configuration. The base station radio control protocol stack may not have visibility to the content of local data cached in the base station. The selection of radio resources for the data to be delivered may be performed in a cross layer interaction. For example, the application may initiate a file transfer that utilizes a TCP/IP service. The TCP/IP traffic pattern is then recognized by the network node (gateways) and mapped to a predefined traffic flow template (TFT). The TFT is then used to map the EPS bearer of specific QoS for radio resource assignment. The network layer entity then detects the traffic patterns of the data service and identifies the QoS requirement. The PCC rule is configured in the CN that determines the allocation of CN data routing resources as well as requirements for call delivery QoS. The network may define a PCC rule such that when the application requested a service that may utilize local caching, the PCEF may translate the request to initiate an EPS bearer connection, (which is translated to E-RAB by MME), with source data transport destination mapped to the base station with caching support of the requested data using S1AP E-RAB setup procedures for VDFS.

In the case where a normal call is established in the area where the base station does not support caching but later moves into a region that has caching support, the application may request a service change to use the caching service. In this case, an E-RAB modify procedure may be initiated by the CN to modify the normal service to a VDFS service.

The S1AP procedures may be modified so that multiple site IP address, (the IP address may correspond to an S-GW or an base station), may be provided to signal the data source for VDFS as well as indicating if the individual sites are receiving data from an S-GW or a local cache associated with an base station.

The WTRU may be configured with security information assigned to individual sites to decipher the data reception from respective site.

Figure 6A:
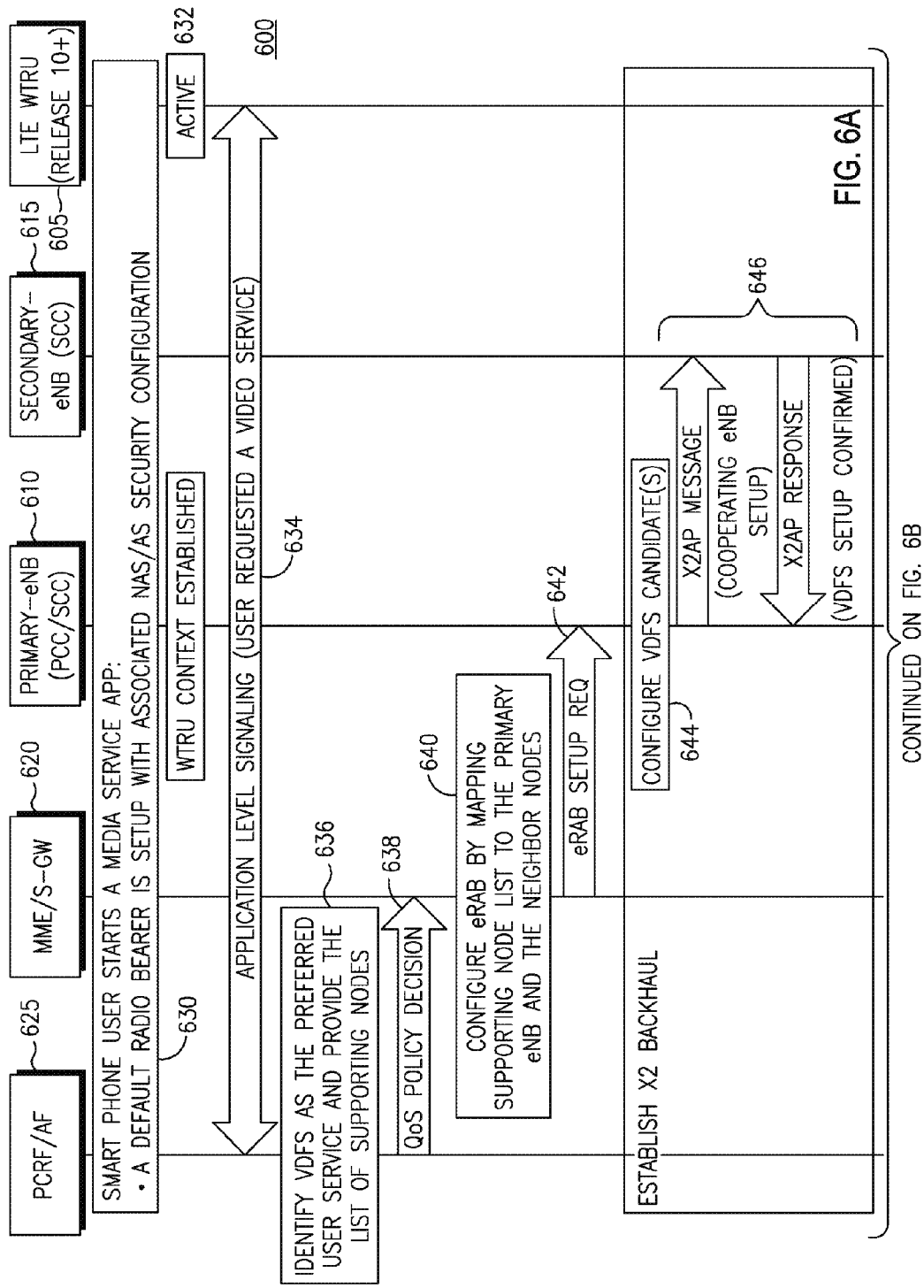
FIGS. 6A and 6B are an example call setup sequence of a wireless transmit/receive unit (WTRU) initiating streaming video on an activated VDFS call.
Figure 6B:
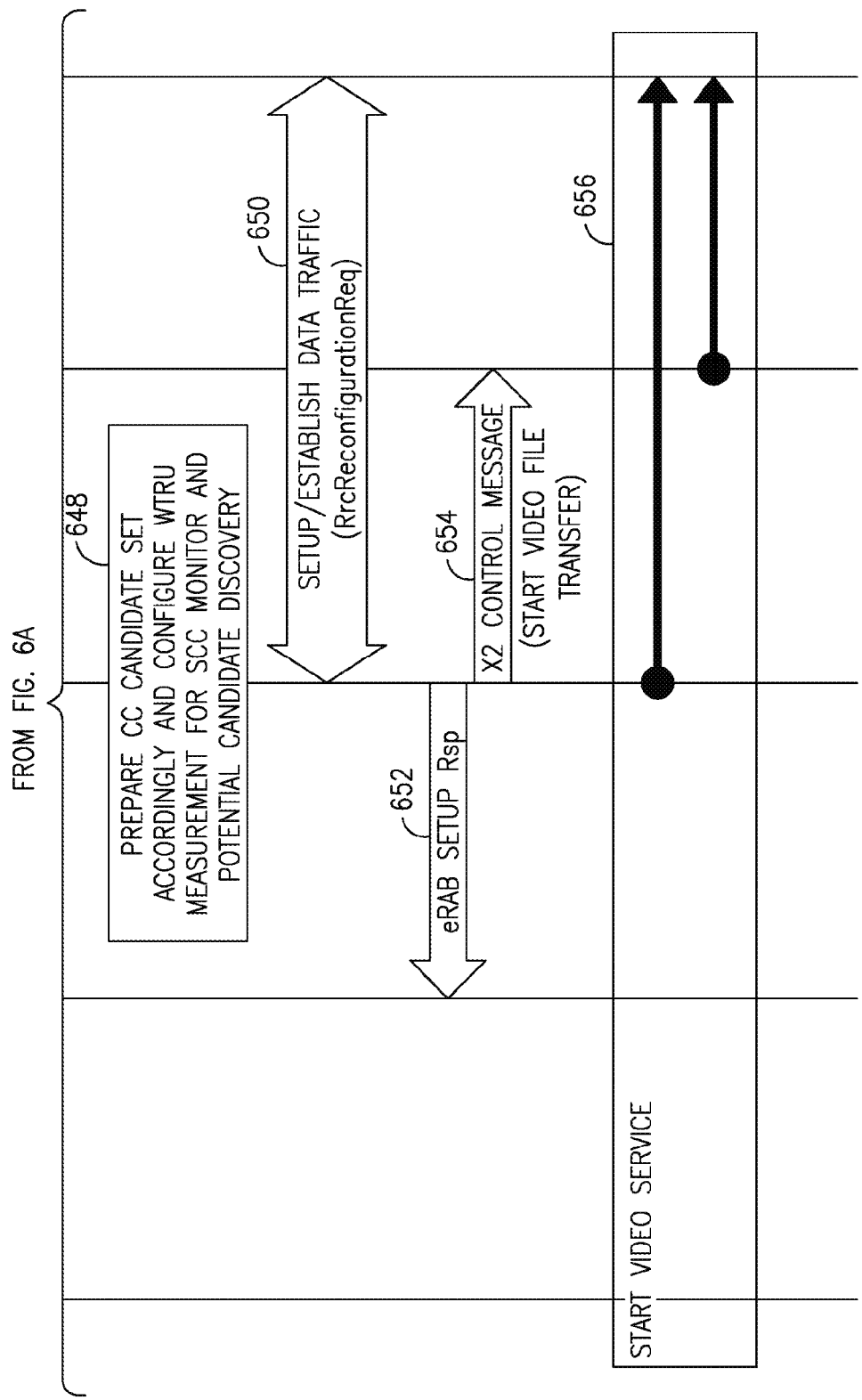

FIGS. 6A and 6B are an example call setup sequence 600 of a WTRU 605 initiating streaming video that causes the establishment of a VDFS call. A system for performing the call setup sequence 600 may include the WTRU 605, a primary base station 610, (i.e., a primary-eNB), a secondary cooperating base station 615, (i.e., a secondary eNB), a MME/S-GW 620 and a Policy and Charging Rules Function (PCRF)/Application Function (AF) 625. The WTRU 605 may initiate an RRC connection to connect to the application server using a low none-guarantee bit rate (NGBR) interactive service QoS (630). The network establishes a default EPS bearer to enable the WTRU 605 to exchange information with the public data network (PDN) through PDN gateway (P-GW). Once the default bearer is setup (632), the WTRU 605 may request via an application layer a streaming video service (634).

This change in data service may be detected in the network causing a new E-RAB to be established. The network may further identify that the video file is cached in primary base station 610 and therefore establishes a video streaming service (QCI 6) that uses the cached file. The base station may further determine that data-splitting is favorable given current radio environment and configures the WTRU for VDFS. In particular, the PCRF/AF 625 may identify VDFS as the preferred user service and provide a list of supporting nodes (636).

In this scenario, the P-GW (not shown) initiates a new dedicated EPS bearer to support the video service call. The VDFS call in this scenario assumes that the full set of user information (as shown below) is coming directly from the local cache. Therefore, the P-GW is not required in the data path. However, the WTRU still has a default bearer that has a P-GW link to the PCRF/AF 625. The default bearer is used in the initial application exchange and provides the service information to the PCRF to determine the supported QoS of the initiating user service. This information is provided to the MME/S-GW 620, (if no direct connection via P-GW), to establish the VDFS. In the create dedicated Bearer Request message, the P-GW may provide all available traffic flow description information such as source and destination IP address, port numbers, the protocol information in the traffic flow template (TFT) and the QoS parameters to the S-GW of the MME/S-GW 620 and the S-GW forwards same information to the MME of the MME/S-GW 620. In particular, a QoS policy decision is transmitted by the PCRF/AF 625 to the MME/S-GW 620 (638).

The MME/S-GW 620 then configures E-RAB by mapping the supporting node list to the primary base station 610 and the neighbor nodes (640). The E-RAB setup request is transmitted by the MME/S-GW 620 to the primary base station 610 (642). The MME of the MME/S-GW 620 initiates the E-RAB Setup Request with a downlink (DL) transport address mapped to the source node where DL data is cached (provided in TFT). The caching node may be an S-GW, P-GW, primary base station, and/or serving base station depending on the supporting cache architecture as described herein above. The uplink (UL) transport address is also established by mapping to dedicated EPS bearer S/P-GW. This path is maintained to allow proper charging accounting information to be tunneled back to the PCEF via General packet radio service (GPRS) tunneling protocol (GTP) for proper service charge crediting. In this scenario where file caching is sourced on a base station, the base station may provide charging information as described herein.

The primary base station configures the radio network resource to support E-RAB Setup Request mapping to caching node (644). If data-split support is desirable, a VDFS is configured by setting up the cooperating base station over X2 for multi-site user data subflow as described herein above (646). the primary base station 610 may prepare a CCC candidate set accordingly and configure WTRU measurement for SC monitor and potential candidate discovery (648).

A RRC connection reconfiguration is initiated to establish the supporting radio link (650). The base station provides the EPS bearer UL address to caching entity for charging and data service control. The address of the caching entity is provided back to the MME on successful E-RAB Setup Response message (652) and then forwarded to P-GW on Create Bearer Response message. The primary base station 610 transmits a control message to start the video file transfer (654). The video file transfer process is then performed between the primary base station 610 and secondary/cooperating base station 615 (656).

During handover preparation, the IWFC entity on the primary base station may initiate a request, (via GTP control frame on EPS bearer), to a CN application service or alternative verification entity in the network to check if the target site has the desired application data cached in the storage. If the target base station has the desired data cached, the VSDF may be configured as part of handover. In this case, the data forwarding of incomplete transfer may not be necessary. Instead the SN status transfer message may be modified to provide the index to the cache for continual transmission or be replaced by a new message that provides the continuation information. If the target base station does not have the desired data cached, VDFS is either turned off or configured as in FIG. 5 and normal multi-site handover is performed.

Figure 7A:
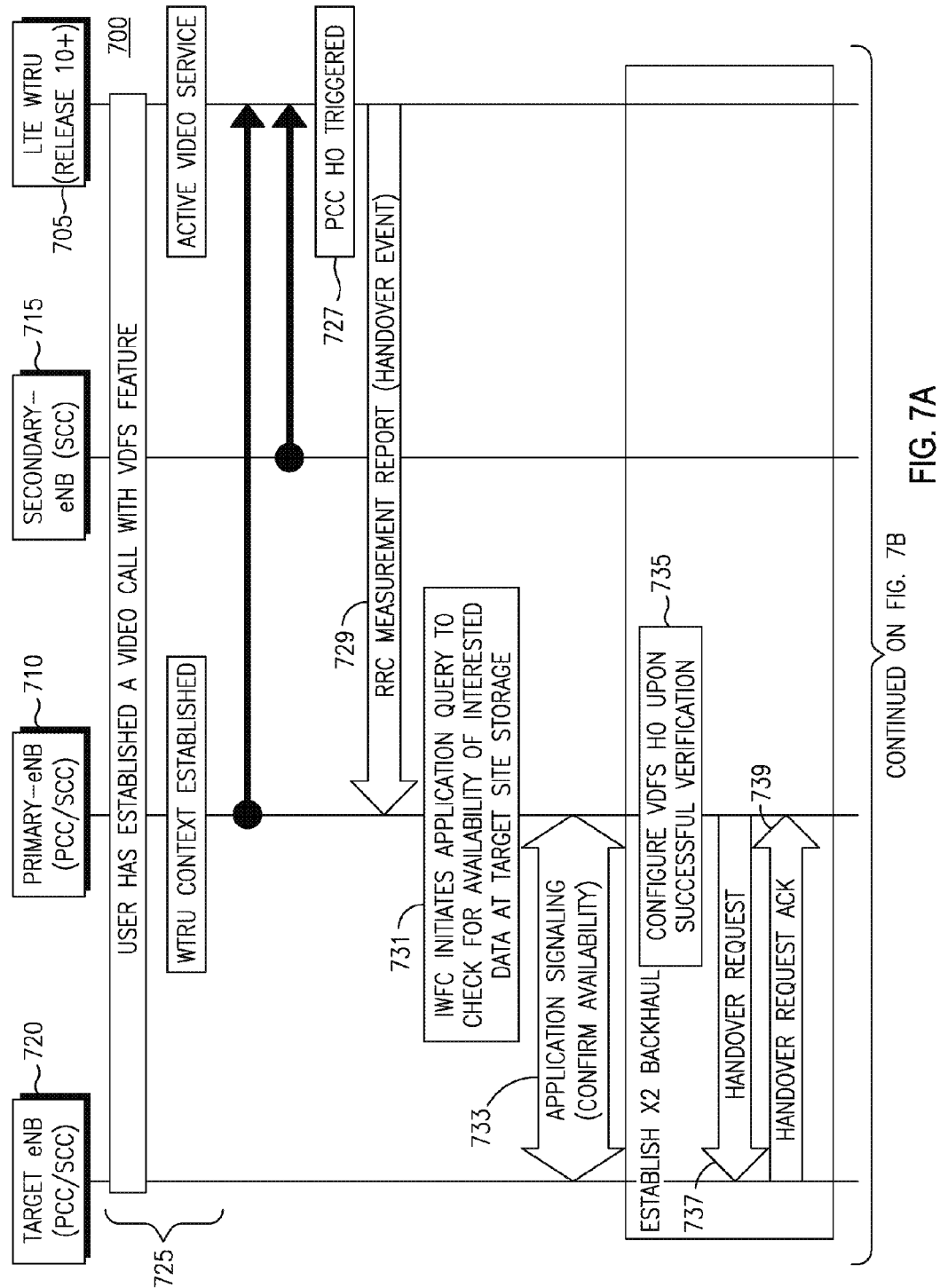
FIGS. 7A and 7B are an example intra-Mobility Management Entity (MME) VDFS handover.
Figure 7B:
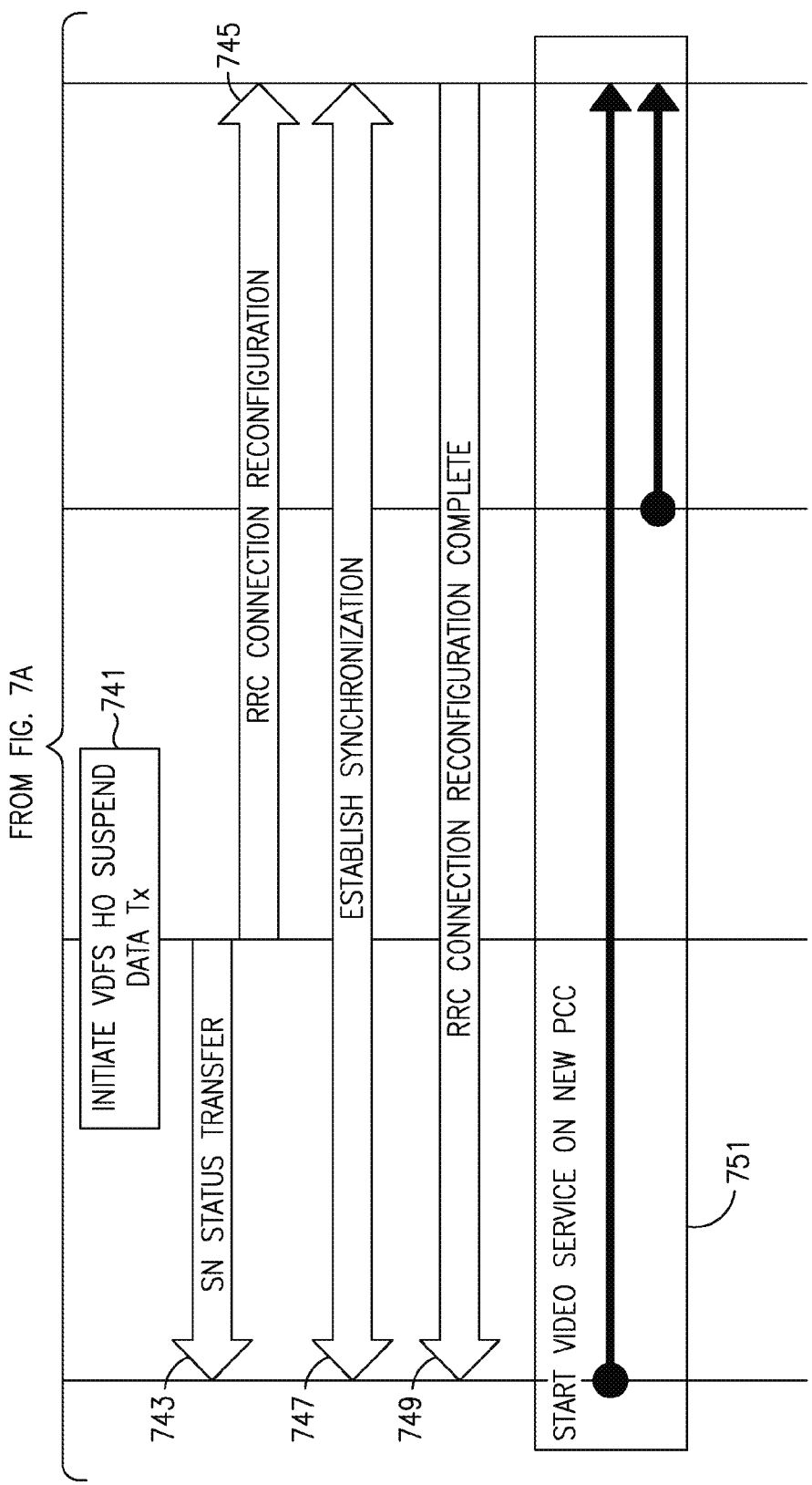

FIGS. 7A and 7B are an example intra-MME handover sequence 700 of an existing VDFS call where a primary base station handoffs to a target base station also with caching support. A system for performing the intra-MME handover sequence 700 may include a WTRU 705, a primary base station 710, a secondary base station 715 and a target base station 720. As stated, a VDFS call is already in place (725). A handover is triggered by a WTRU measurement event (727) and a RRC measurement report is transmitted to the primary base station 710 (729).

In a VDFS call, the DL data is provided directly from the file cache without a S5/S8 bearer and therefore it is necessary to determine if the target base station 720 can provide the cache data or an alternative link either the DL EPS bearer (S5/S8) or, if direct forwarding is available, an X2 tunnel from the current cache needs to be established. In particular, an IWFC initiates caching inquiry to check availability of interested data at target site storage (731) The primary base station 710 confirms availability with the target base station 720 (733).

In this example, the target base station 720 also has a cache support with direct X2 line (735) and an X2 handover of established QoS and routing information is forwarded by the primary base station 710 to the target base station 720 by a Handover Request Message (737). The primary base station, upon receipt of an acknowledgement (ACK) (739), initiates VDSF HO (741), and sends a sequence number (SN) status transfer (743).

A RRC Connection Reconfiguration procedure (745) is preformed, synchronization is established (747) and a RRC connection configuration complete is transmitted (749). The SN status transfer is sent on X2 interface to provide the last successful transmission status but PDCP data packet forwarding is not necessary as the packets are already available at the local cache. On completion of the radio network handover, the target base station 720 initiates a Path Switch Request to the MME to update the EPS bearer. The new cache address is provided by the MME to the associated gateway with a create session request message and also deletes the old session. The video file transfer process is performed between the target base station 720, the secondary/cooperating base station 715 and WTRU 705 (751).

Figure 8A:
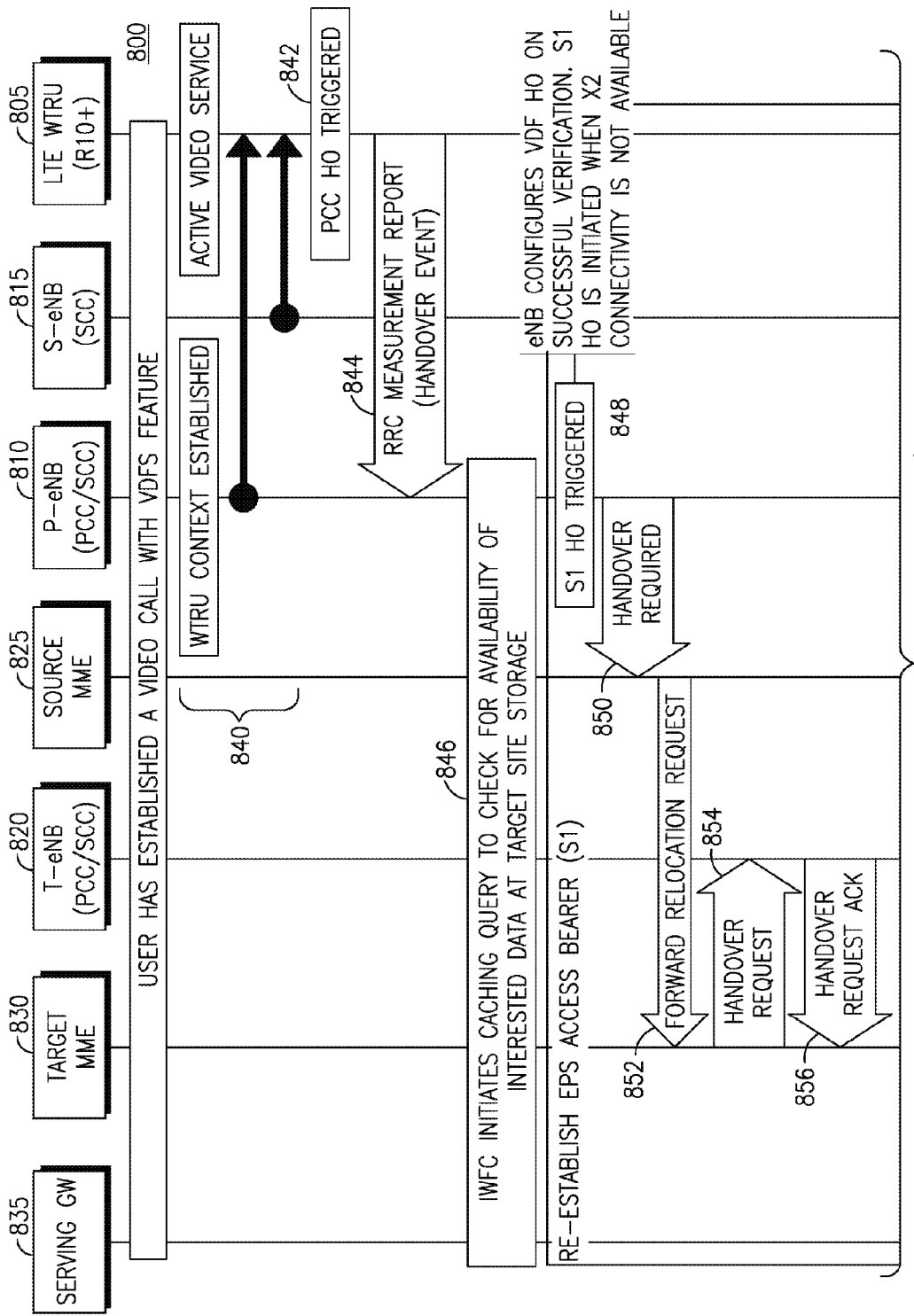
FIGS. 8A, 8B and 8C are an example inter-MME VDFS handover.
Figure 8B:
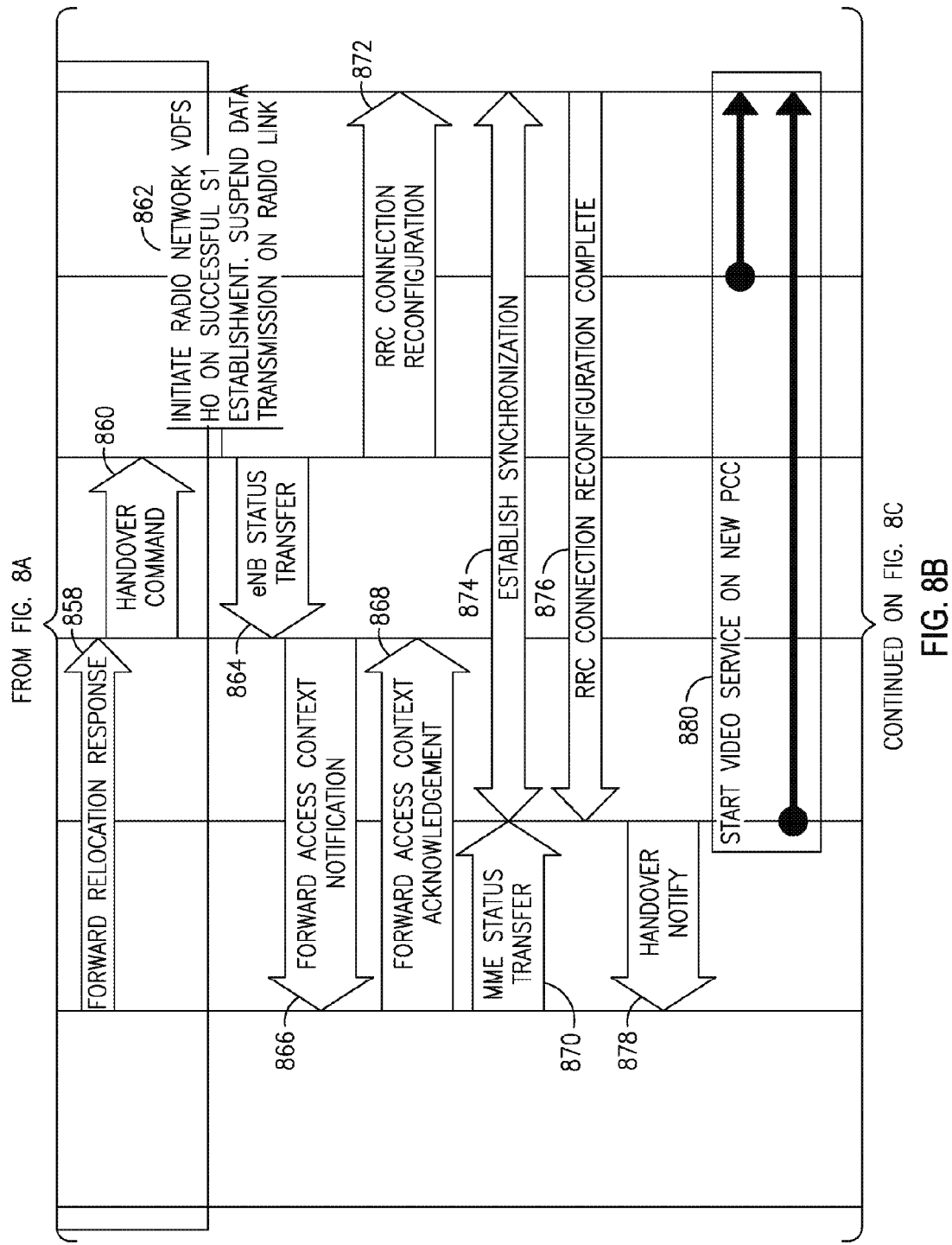
Figure 8C:
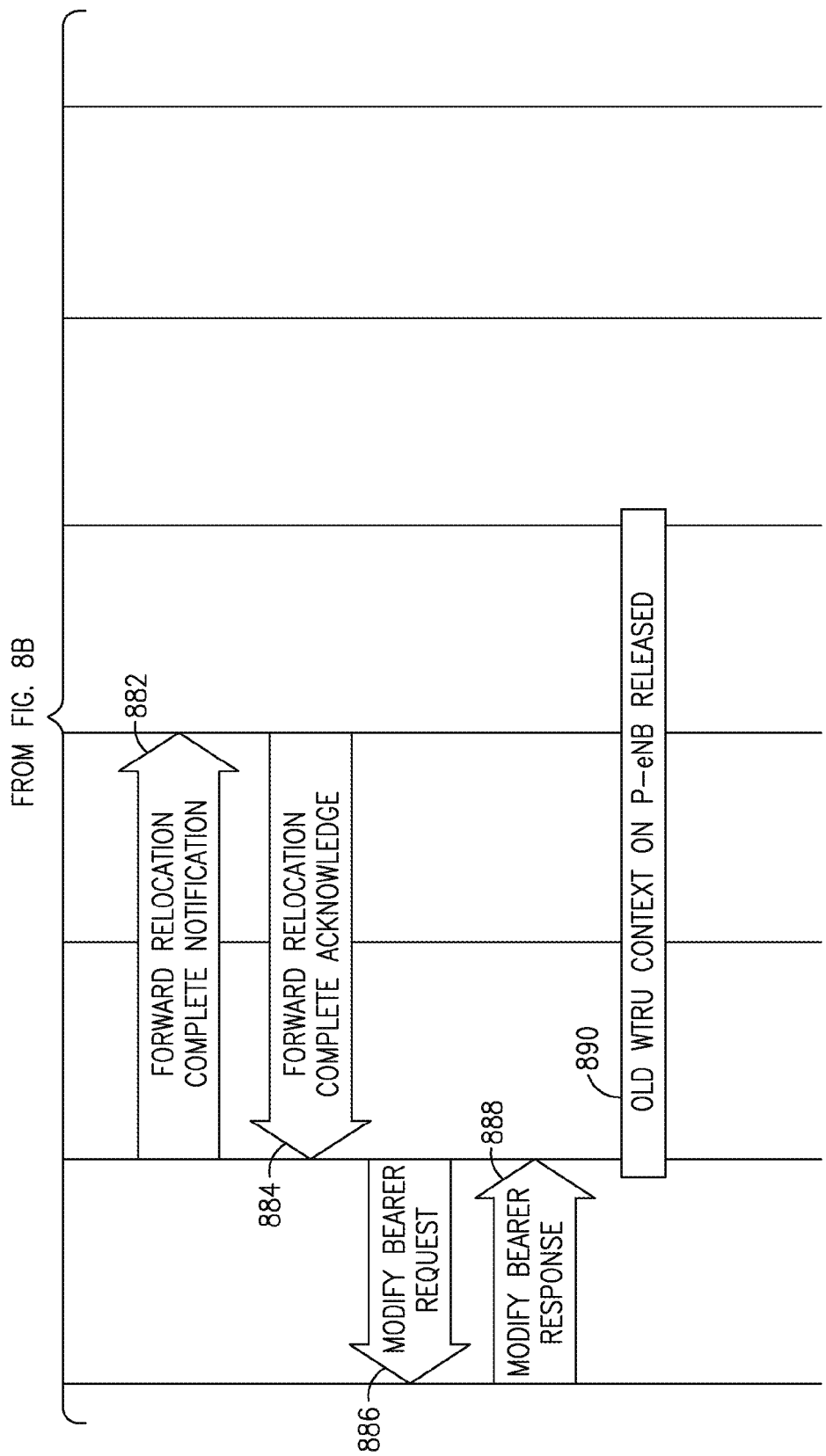

FIGS. 8A, 8B and 8C are a sample inter-MME handover sequence 800 of an existing VDFS call where primary base station is handoff to a target base station also with caching support. A system for performing the intra-MME handover sequence 800 may include a WTRU 805, a primary base station 810, a secondary base station 815, a target base station 820, a source MME 825, a target MME 830 and a serving GW 835. As stated, a VDFS call is already in place (840). A handover is triggered by a WTRU measurement event (842) and a RRC measurement report is transmitted to the primary base station 810 (844). In a VDFS call, the DL data is provided directly from the file cache without a S5/S8 bearer and therefore it is necessary to determine if the target base station 720 can provide the cache data or an alternative link either the DL EPS bearer (S5/S8) or, if direct forwarding is available, an X2 tunnel from the current cache needs to be established. In particular, an IWFC initiates caching inquiry to check availability of interested data at target site storage (846).

The target base station 820 does not have a direct X2 interface with the primary (source) base station 810 and a S1 handover is triggered (848). The primary base station 810 and a handover request is transmitted to the target MME 830 (852) via a source MME 825 (850). The source MME 825 determines that MME relocation is required, (e.g., a tracking area update) and the EPS bearer context including VDFS configuration is therefore forwarded to the target MME 830. The target MME 830 initiates a Handover Request procedure to the target base station 820 to configure the EPS bearer support accordingly (854). The target base station 820 confirms if VDFS is supported and provides the transport layer information in the Handover Request Acknowledge message (856). The new VDFS configuration is sent back to the source MME 825 in a Forward relocation response (858) and forwarded to the primary (source) base station 810 in a Handover Command (860) to initiate radio link handover (862). The target base station 820 also supports file caching therefore the eNB/MME status transfer message only provides the VDFS transmit status and user packet forwarding is not performed (864).

The source MME 825 transmits a forward access context notification to the target MME 830 (866), which in return transmits an ACK back to the source MME 825 (868). The target MME 830 also forwards a MME status transfer message (870). A RRC Connection Reconfiguration procedure (872) is preformed, synchronization is established (874) and a RRC connection configuration complete is transmitted (876). A handover notify message is sent by the target base station 820 to the target MME 830 (878). The video file transfer process is performed between the target base station 820, the secondary/cooperating base station 815 and WTRU 805 (880).

The target MME 830 transmits a forward relocation complete notification message to the source MME 825 (882), which in turn transmits back an ACK to the target MME 30 (884). A modify bearer request is transmitted to the serving GW 835 (886), which in turn transmits a modify bearer response back to the target MME 830 (888). The old WTRU context on the source primary base station is released after successful handover establishing the target base station as the primary base station (890).

Described herein are caching network operations. There are two entities that make up the caching network: the user data storage entity, (i.e., a file caching/content server), and the network server, (may be a network file server and/or domain name server depending on the type of service traffic cached in the system). The network server may be referred to as a file name server (FNS) or domain name system (DNS) server. The content server/local cache may reside in the gateway node or the base station, as applicable. The network file server is part of the evolved packet core network with an interface to the PDN and serving gateway. The network server provides the rules to the user data storage entity to determine what user data is to be cached.

Described herein is virtual data traffic pattern detection. As outlined in FIG. 6, prior to establishing the VDF, a default EPS bearer is established in the EPC. In the network that supports caching, the network file server or domain name server is configured to intercept default and some dedicated, (such as buffer video stream), EPS bearer traffic to detect and inform P-GW/PCEF to start edge caching service on the dedicated EPS bearer.

Described herein is a MME configuration. The MME is responsible for relaying caching support information to the gateways when initiating an EPS access bearer session or configuring radio bearers corresponding to requested EPS access bearer. The MME is informed of caching support only when file caching is supported on a serving base station. There are two S1AP messages that provide this status. One message is the Initial WTRU Message, where the MME relays the information to the S-GW for default access bearer routing setup. The other message is the Handover Request Acknowledge Message, where the MME uses the information to determine if EPS access bearer modification is required, i.e., handover of a VDFS call to a base station that does not support caching or vice versa.

The S-GW may need to support the cache file server/local cache to intercept selected EPS access bearer traffic when it is configured by the MME with VDF enabled. If the S-GW supports file caching, then VDF support is always enabled.

The MME may be configured by the gateway with EPS access bearer that is setup/modified to support VDF. The MME shall map the TFT and QoS to the corresponding radio bearer and initiate E-RAB setup/Modify procedure to configure the base station accordingly.

The MME may consider the subscriber data and determine not to support data-split service for the user. In this case, the MME may signal the base station not to support VDFS in the Initial Context Setup Request message. However, file caching may still be supported using the same EPS access bearer configuration sequence for VDFS but setting up only a single radio link data flow from one site.

Following are the interfaces that may be modified to setup and maintain VFDS. The S1AP procedures that may be affected include, for example, the Initial WTRU Message, which may include a new IE to support VDF on the base station. Another example procedure may be the Initial Context Setup Request, which may include a new IE to enable VDFS operation. Another example procedure may be the WTRU Context Modification Request, where the Security Configuration option may be modified to specify security key configuration for data split subflow and may provide multiple security Key corresponding to VDFS. Another example procedure may be the E-RAB Setup, where the E-RAB may be modified to specify if VDFS is enabled and if VDFS is enabled, provide Transport Layer Address for each site and associated VDFS cache support indicator, (interested data available or not).

Another S1AP procedure may be, for example, the E-RAB Modify, where the E-RAB Modify may be modified to specify if VDFS is enabled and if VDFS is enabled, provide Transport Layer Address for each site and associated VDFS cache support indicator, (interested data available or not). Another example procedure may be Handover Preparation, which may include a new IE for VDFS HO indication. This procedure may also modify the Handover Command message information element (IE) "E-RABs subject to forwarding item" to specify if VDFS is enabled and if VDFS is enabled, provide Transport Layer Address for each sites and associated VDFS cache support indicator, (interested data available or not). The source base station may setup X2 cache content forwarding if caching is not supported at a target base station.

Another S1AP procedure may be the Handover Resource Allocation, where the Handover Request, (E-RAB to be setup item), may be modified to specify if VDFS is enabled and if VDFS is enabled, provide Transport Layer Address for each sites and associated VDFS cache support indicator, (interested data available or not). Moreover, it may be modified to include a new IE for Security Configuration option, which may specify security key configuration for data split subflow and may provide multiple security Keys corresponding to VDFS. In addition, the Handover Request Acknowledge, (E-RAB admitted item), may be modified to specify if VDFS is enabled and the associated VDFS cache support indicator.

Another S1AP procedure may the ENB Status Transfer, which may include a new IE for configuration of the starting point for resuming IP transmission, (i.e., starting index for source payload). Another example may be the MME Status Transfer, which may include a new IE for configuration of a starting point for resuming IP transmission, (i.e., starting index for source payload).

The X2AP procedures that may be affected include, for example, the Handover Request, which may be modified, (E-RAB to be setup item), to specify if VDFS is enabled and if VDFS is enabled, provide Transport Layer Address for each sites and associated VDFS cache support indicator, (interested data available or not). In addition, the AS security information may be modified or a new IE may be included to specify security key configuration for data split subflow and may provide multiple security Key corresponding to VDFS. Another example procedure may be the Handover Request Acknowledge, which may be modified, (E-RAB admitted item), to specify if VDFS is enabled and the associated VDFS cache support indicator. Another example procedure may be a SN Status Transfer, which may include a new IE for configuration of a starting point for resuming IP transmission, (i.e., starting index for source payload).

The RRC messages that may be affected may be the RRC connection reconfiguration, which may modify the IE for configuration of component carrier (CC) specific security information.

Described herein is IP data synchronization. The following interfaces may be modified to support coordination of caching data provided to the IP layer on the same site. The X2AP or G-TPU interface may be modified to support the primary site signaling to the cooperating site of certain information including, for example, cooperating site transmission rate, target transmission rate, cooperating transmission ratio and the like. The IWFC entity-to-external storage interface may be modified to have configuration for the cache to provide IP services (v6 or v4) for streaming files including SVC class selection, (in case of video streaming), or frame interleaving that matches requested data rate and/or file download including file segmentation, (starting transmission information and size to be transferred).

The addition of data caching capability may be a base station internal or external hardware device that may be subject to equipment failure or maintenance as well as a later addition of features to existing base stations. Therefore, a parameter, (for example, a bit, a Boolean, or the like), may be added for reporting of this feature support in the base station equipment status reporting as indicated below. Alternatively, this feature may be a proprietary configuration supported by operation and maintenance (O&M) configuration or other proprietary interface. The S1AP messages that may be affected include base station configuration update, and base station configuration update acknowledge. The X2AP messages that may be affected include resource status update, resource status response, and the like.

Described herein are edge-caching configurations without data-splitting. The example embodiments described herein below use baseline LTE Release 8 and later networks but are also applicable to UMTS/3GPP2 networks. The P-GW and the PDN-GW terminology are used interchangeably in this document.

Operators may gain huge benefits by placing content servers which cache static content in close proximity to the radio access network node. In other words, the closer the content to the radio access network (RAN), the better for several reasons including for example the reduction in the amount of traffic that has to be carried over the operators core network, the reduction in the service delay to the end user and improvement to the user's quality of experience (QoE), and better opportunity for load balancing in the operator's network.

If content servers are placed closer to the RAN, this may lead to improvements as the content servers will be physically closer to the edge node. This, however, may bring several challenges: 1) How do we determine the content server node where the data is cached?; 2) Once we determine where data is cached, how does the cellular network use this information to modify/remove the parts of the Evolved Packet System (EPS) bearer that are not required?; 3) How is billing handled for the services that are serviced locally by the cached content servers?; 4) How is policy enforcement handled for the services that are serviced locally by the cached content servers?; and 5) How is data routed for the services that are serviced locally by the cached content servers?

Figure 9:
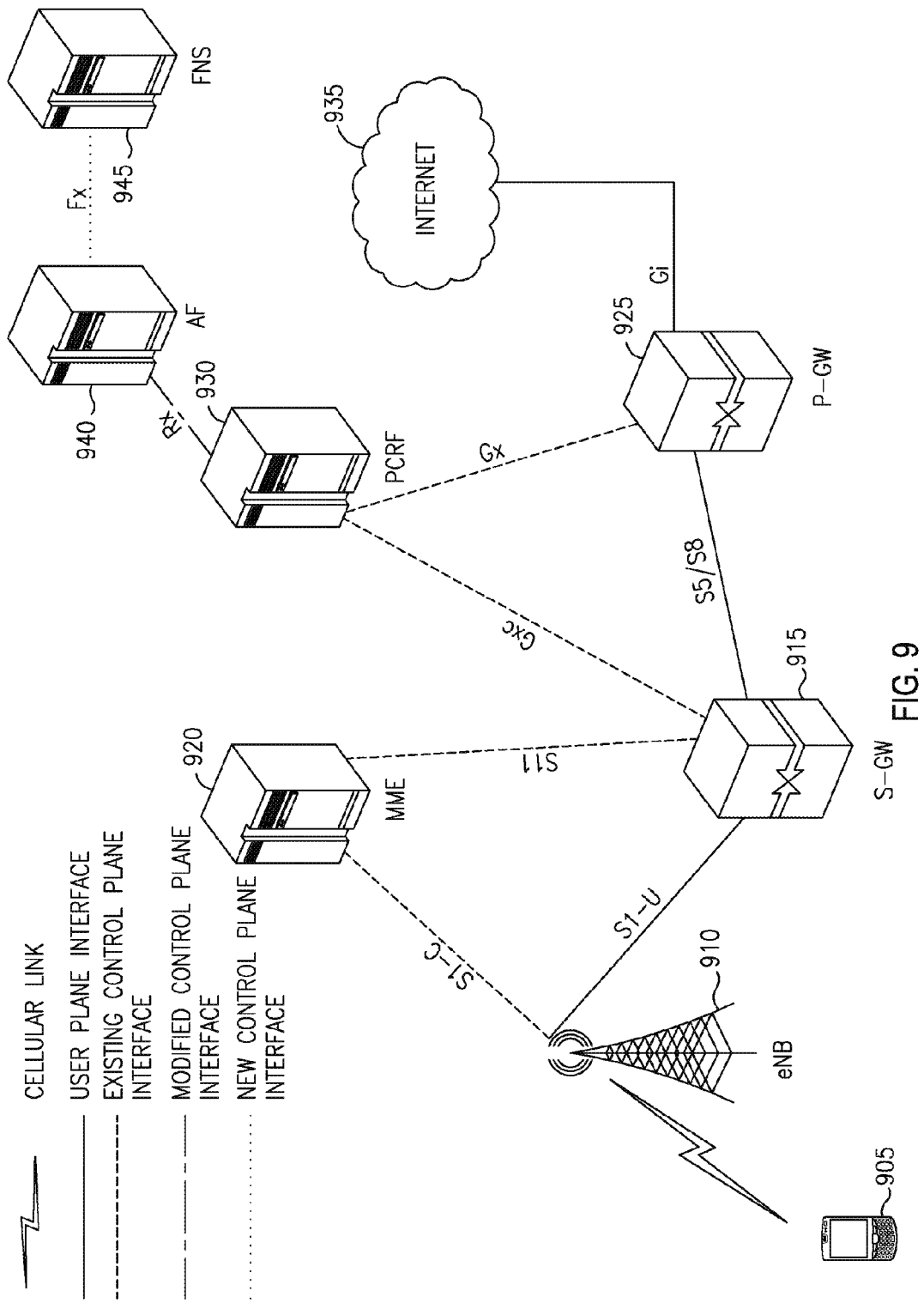
FIG. 9 is an example evolved packet core (EPC) architecture with file name server (FNS) and corresponding interfaces.

FIG. 9 shows an example of EPC system architecture 900 with a FNS and corresponding interfaces. The EPC system architecture includes at least a WTRU 905 in communications with a base station 910, which is in turn in communication with a S-GW 915 and a MME 920. The S-GW 915 is also in communications with the MME 920, a P-GW 925 and a PCRF 930. The P-GW 925 is connected to the Internet 935. The PCRF 930 is further connected to an application function (AF) 940, which in turn is connected to a FNS 945 via an Fx interface.

When the user initiates a service, the end-to-end application signaling is intercepted by the AF 940. For instance, in the case of the IP Multimedia Subsystem (IMS), the AF 940 will become the same as a Proxy Call Session Control Function (P-CSCF). The FNS 945 responds to cache related queries and may provide a response as to whether the requested data is cached and may also include the address of the node that is caching this file. This may be done in association with a local/external DNS server. When the application signaling is received by the AF 940, it checks with the FNS 945 to see if the data for this service is already cached in one of the content servers (not shown). If the FNS 945 determines that the data is cached, it will also include the address of the node that is currently caching the data.

In the case where the content server is co-located with either a RAN node or EPC node, it may provide the address of this node if the DNS server supports more powerful features such as Name Authority Pointer (NAPTR) and Service record (SRV records), (for instance to enable co-located nodes and proximity). If the content server is not co-located with a RAN/EPC node, but is placed somewhere in the operator's domain, the DNS server may also obtain information related to the RAN/EPC node on the data path that is closest to this cache server. In other words, the DNS server provides information on whether the base station, S-GW or PDN-GW is the closest to this content server/local cache.

The placement of the content server may be an operator's deployment preference and may be driven by multiple factors. The methods described herein facilitate obtaining caching information irrespective of where the content server is placed within an operator's domain. Methods are also described to enable deployment scenarios where a content server may be co-located with one of the existing RAN or EPC nodes. In some implementations, there might be multiple content servers within an operator's domain, with some co-located with RAN/EPC nodes and others which might be physically separate. The methods described herein apply to all or any of these combinations of content server placement.

Once the node of where the content server is located is determined along with the closest RAN/EPC node in the data path by exchange of signaling between AF and FNS/DNS servers, this information is provided to the PCRF over the updated Rx interface. In LTE, the session information is mapped at the AF from a Session Description Protocol (SDP) typically containing QoS information and 5-tuple information for involved IP flows. In an example method, the Rx interface may be updated with additional information, for example, if the content for this IP flow is cached, the address of the content server, and the address of the closet EPC/RAN node for this server for IP flows for which data is cached locally within operator's domain. In order to reach the content server, required IP flows may be routed from the base station to the content server by using tunneling protocol like GTP or Proxy Mobile IPv6 (or PMIPv6, or PMIP), which are well known to one skilled in the art.

Figure 10:
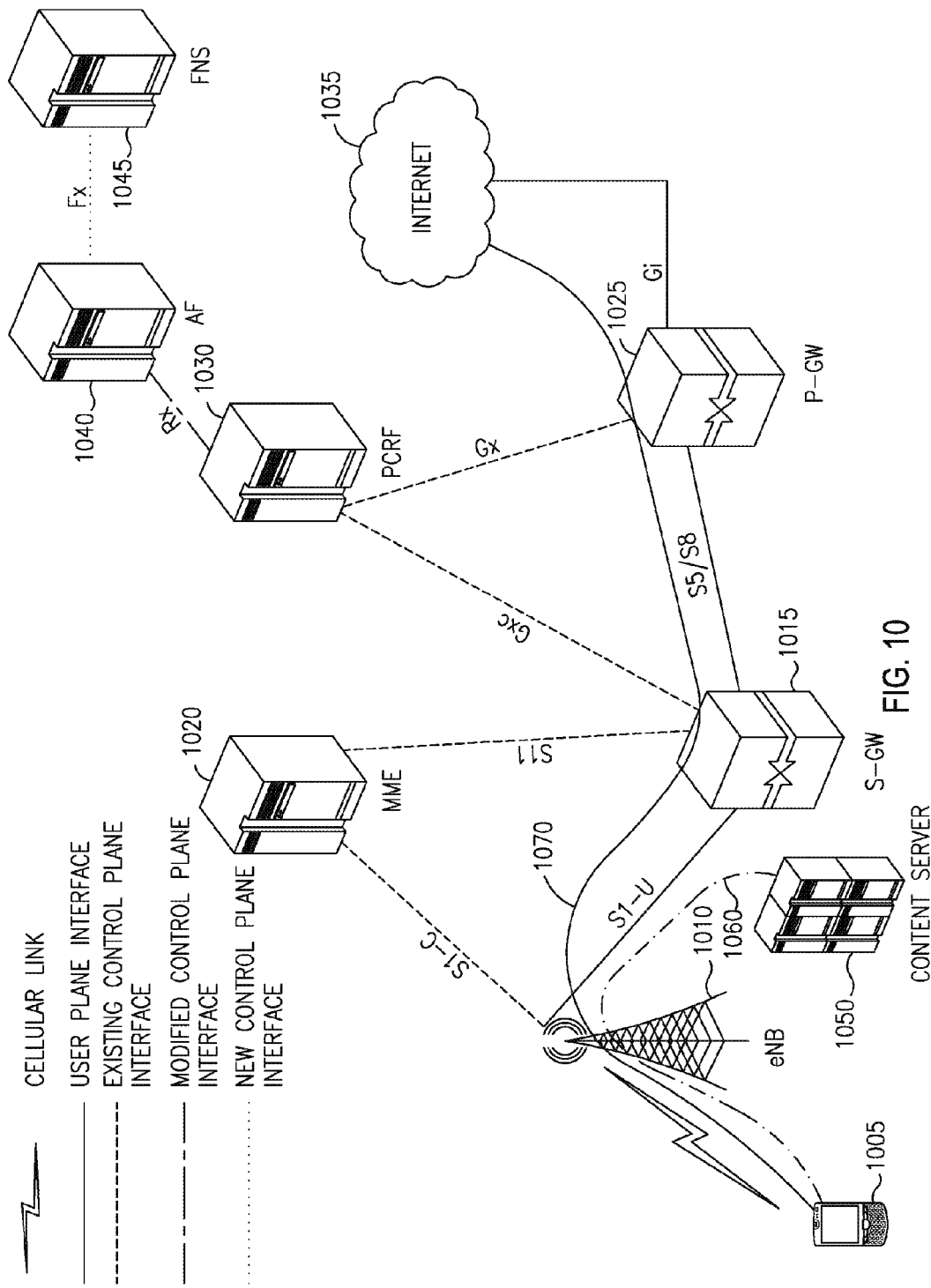
FIG. 10 is an example of data flow handling in an evolved packet system (EPS) with content server in operator's domain.

In an example embodiment, the functionality of the closest RAN/EPC node may be augmented to include IP flow based routing policies along with a subset of PCEF functionality. The IP flow based routing policy may ensure that the data serviced by the content server gets diverted to the content server and that rest of the data flows through the operator's network as in the baseline LTE system. This is depicted in FIG. 10 which illustrates data flow handling in EPS with the content server in the operator's domain. System architecture 1000 includes at least a WTRU 1005 in communications with a base station 1010, which is in turn in communication with a S-GW 1015 and a MME 1020. The S-GW 1015 is also in communications with the MME 1020, a P-GW 1025 and a PCRF 1030. The P-GW 1025 is connected to the Internet 1035. The PCRF 1030 is further connected to an application function (AF) 1040, which in turn is connected to a FNS/DNS 1045 via an Fx interface. A content server/local cache 1050 is located in an operator's domain.

In this example, the content server 1050 is physically closer to the base station 1010. The IP flow based routing policy in the base station 1010 uses the IP flow based routing information it received to determine how each of the IP flows are routed. The IP-flow 1060 is cached in the content server 1050 and it gets routed to the content server 1050 from the base station 1010 and does not go through the S-GW 1015 and/or P-GW 1025 to the internet/packet data network (PDN). Instead this IP data flow is serviced by the content server 1050 dramatically reducing the latency experienced by the user. Other flows 1070 flow through the RAN and EPC as per the LTE system.

Also in the above example, since the IP data flow(s) 1060 do not go through the P-GW 1025 where the PCEF functionality is traditionally executed per the LTE system, a method for enforcing the policies set by the PCRF 1030 and capturing the records for charging may be needed. This may be achieved by executing a subset of PCEF functionality at the base station 1010. The example described herein above may be modified to place the content server 1050 closer to the S-GW 1015. The content server 1050 may also been co-located with base station 1010 or S-GW 1015. In another example, there may be multiple content servers servicing a given user (or multiple users). In such a scenario, some IP-flows may terminate at content server 1, other IP-flows may terminate at content server 2 and the rest might traverse through the EPC to reach the Internet or their respective PDNs. In all these scenarios, the procedures described above with the base station example may apply. The main distinction is that if some of the content servers are closer to the base station and others are closer to the S-GW then both the base station and the S-GW may need to be equipped with IP flow based routing policies along with a subset of PCEF functionality.

In order to extend the PCEF functionality to the base station and/or S-GW, the existing S1-U and GTPv2-C based S5 interfaces may need to be updated. This may be done by extending the existing messages on S1-U and S5 or by introducing messages similar to that on the Gx interface. Intelligence at the P-GW may be extended to send the PCC rules it receives from PCRF to the corresponding entity (or entities) that are closer to the content server for their respective IP flows. For each user on a per IP-flow basis, the P-GW may identify if that IP-flow is cached and if so, obtain the IP address of the content server and the closest RAN/EPC node to it on the data path. This may then be forwarded to the closest RAN/EPC node along with its corresponding PCC rule via updated S1 or S5 interfaces as described herein above. The S1-U and S5 interfaces may need to accommodate the transmission of charging records from the base station and/or the S-GW to the P-GW.

Described herein are procedural details. In the baseline LTE system, there are two methods with respect to PCC architecture: off-path and on-path models. The off-path model is with Bearer Binding and Event Reporting Function (BBERF) and on-path model is without BBERF. In the off-path model, PCRF waits for the WTRU request to pull the PCC rules whereas in the on-path model, PCRF pushes the PCC rules to the PDN-GW. The methods described herein apply to both the on-path and off-path models.

In the off-path model, the WTRU may initiate the QoS request for the new IP-flow(s). This request may include the QoS requirement for these new IP flows. In the off-path model, BBREF in S-GW is provided with this request and it initiates a dialog with PCRF. Prior to this request, the WTRU and the AF have exchanged application level signaling. Per updated procedures described above, the AF determines, in association with FNS/DNS servers, if any of these flows need to use content that is cached somewhere within the operator's domain. If so, the AF provides this information to PCRF via the updated Rx interface. At this point, PCRF has all the required information to determine what the policy PCC rules and the QoS rules should be for these new IP flows. In addition, the PCRF may determine the IP routing policies based on the content server information received from the AF.

Apart from sending the PCC rules to the PCEF in the P-GW, per LTE baseline, PCRF also sends the QoS rules to BBERF. BBERF uses this information to determine how the bearers should be established. The PDN-GW (also known as P-GW) based on the information provided by PCRF regarding the content server may determine whether any of the content servers for any of the IP-flows are closer as compared to the S-GW and the base station on the data path. If the PDN-GW recognizes that any of the IP-flows are serviced by a content server that is closer to it (i.e., the P-GW) or if the content server is co-located with it, the PDN-GW will update its IP routing policies for this data to be routed to the appropriate content server and will not forward any of the content server information related to these IP flows to the S-GW.

For EPC/RAN nodes that are downstream to P-GW, for example the S-GW, MME and the base station, they will have no knowledge of these IP-flows. This may be shown using the 4 flows in FIG. 11, which are examples of data flow handling in EPS with multiple content servers in the operator's domain. System 1100 may include at least a WTRU 1105 in communications with a base station 1110, which is in turn in communication with an S-GW 1115 and a MME 1120. The S-GW 1115 is also in communications with the MME 1120, a P-GW 1125 and a PCRF 1130. The P-GW 1125 is connected to the Internet 1135. The PCRF 1130 is further connected to an application function (AF) 1140, which in turn is connected to a FNS/DNS 1145 via an Fx interface. A content server/local cache 1150 is located in an operator's domain, another content server 1160 is co-located with the S-GW 1115 and another content server is located near a P-GW 1170. The Internet 1135 may include at least application servers 1180.

Figure 11:
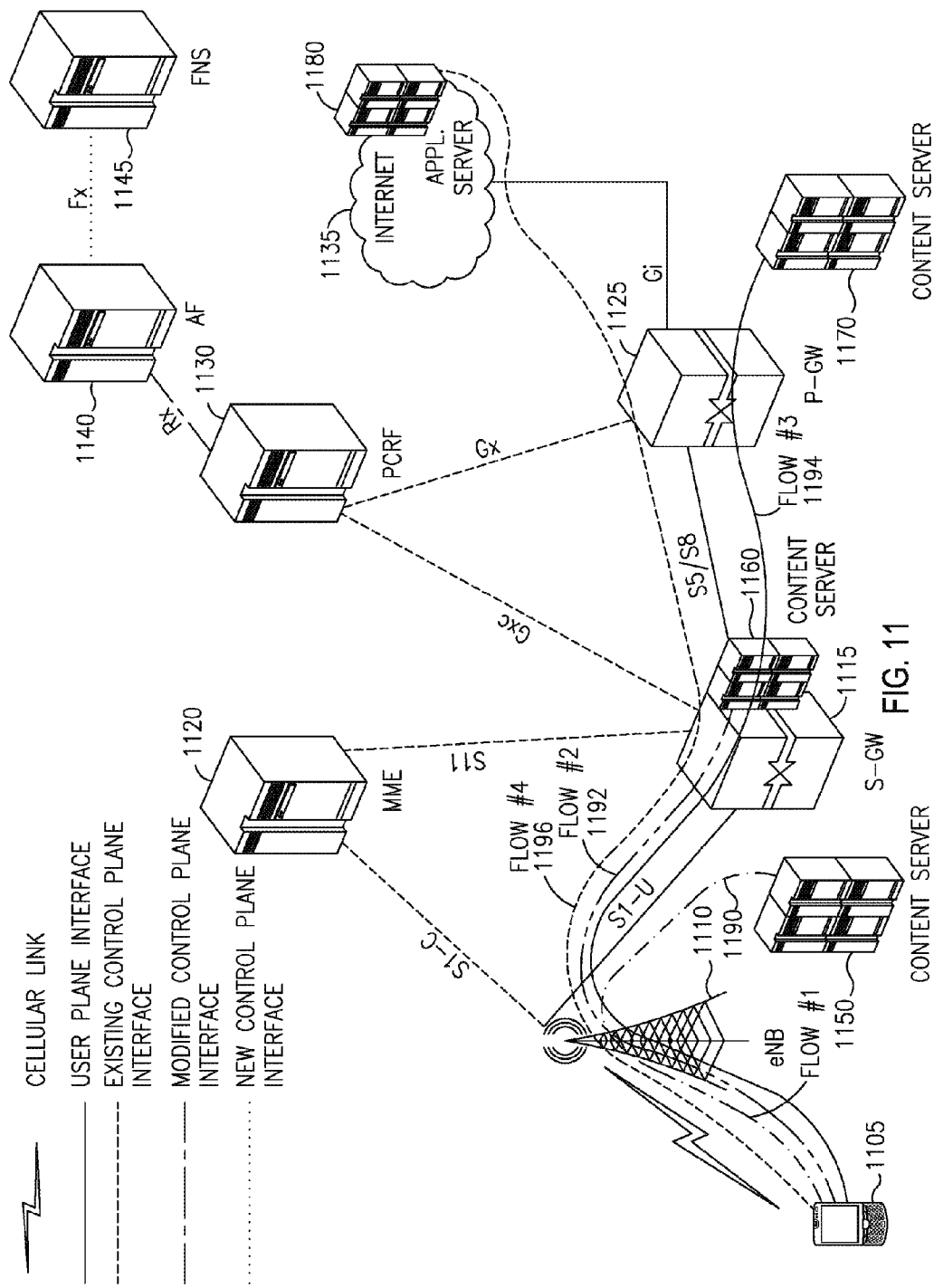
FIG. 11 is an example of data flow handling in an evolved packet system (EPS) with multiple content servers in operator's domain.

There are four flows shown in FIG. 11, flow#1 1190, flow#2 1192, flow#3 1194 and flow#4 1196. Flow#1 1190 is serviced by content server 1150, flow#2 1192 is serviced by content server 1160, flow#3 1194 is serviced by content server 1194 and flow#4 1196 is not serviced by any content server. This flow is similar to the LTE system.

In this case, P-GW 1125, (or PCRF 1130 in the off-path model), will not provide any content server information to the S-GW 1115 about flow#3 1194 even if it is serviced by a content server. The fact that flow#3 1194 is serviced by content server 1170 is tracked by the P-GW 1125 and is not required for downstream nodes. The (base station, MME, S-GW) operation for flow#3 1194 is similar to that of LTE system. The fact that flow#3 1194 is serviced by content server 1170 is purely handled by the P-GW 1125. The IP routing policies in the P-GW 1125 ensure that data is diverted from/to the content server 1170 for flow#3 1194. The P-GW 1125 and PCEF functionality in P-GW may handle the data path and policy enforcement and charging related aspects for flow #3.

For flow#1 1190 and flow#2 1192, the P-GW 1125, (or PCRF 1130 in the off-path model), provides the required content server information to the S-GW 1115. The S5 interface may be updated to include information related to the flows which may be serviced by one or more content servers. This updated information may include one or more of the following: identities (5-tuple) of IP-flows serviced by cached data; association between IP-flows and corresponding content server(s); address of each content server (either IP or other); information related to co-location of content servers with any RAN/EPC nodes; closest RAN/EPC node on data-path to the corresponding content servers; and QoS information related to the IP-flows serviced by content servers.

This information is sent via the GTPv2-C interface on the S5 interface. For demonstration purposes, the "create bearer request" message used on S5/S8 interface has been updated in FIGS. 12 and 13A and 13B to show how the above information may be sent on S5/S8 interface (grey shadow). Similar updates may also be made on other S5/S8 messages such as "modify bearer request" and corresponding response messages such as create bearer response and modify bearer response.

In the off-path model, the BBERF receives this information in PCC/QoS rules and determines if any of the data can be serviced by content servers. If any of the data is locally cached within the operator's domain, then it obtains the QoS and ARP related to these flows. The BBERF in the S-GW 1115 triggers the establishment of appropriate bearers. Similar to the explanation provided above for flow#3 1194 handling in the P-GW 1125, the S-GW 1115 need not provide any content server information related to flow#2 1192 to the MME 1120.

In this case, S-GW 1115 may not provide any content server information to the MME 1120 about flow#2 1192 since it is serviced by content server 1160. The fact that this flow#2 1192 is serviced by content server 1160 is tracked by the S-GW 1115 as it is serviced by a co-located content server and is therefore not required to send information to downstream nodes. Their (eNB, MME) operation for flow#2 1194 is similar to that of the LTE system. The fact that flow#2 1194 is serviced by a content server 1170 is handled by the S-GW 1115.

The IP routing policies in the S-GW 1115 ensure that data is diverted from/to the content server for flow #2. The S-GW 1115 and PCEF functionality in the S-GW 1115 may handle the data path and policy enforcement and charging related aspects for flow#2 1194. Note that the S-GW 1115 needs to also include a subset of PCEF and charging responsibilities for flow#2 1192. This is in addition to the IP routing policy handling which diverts traffic to/from the co-located content server 1160 for flow#2 1192. The S5 interface may need to be extended so that S-GW 1115 may forward the collected information for the life for flow#2 1194 to the P-GW 1125. This may be achieved by introducing new messages to carry policy enforcement and charging information on S5 interface.

For flow#1 1190, the S-GW 1115 provides the required content server information to the MME 1120. It sends the content server information as appropriate to MME 1120 via the S11 interface along with other information. This information may be sent for example using the "downlink data notification" message over the S11 interface. The message updates are shaded as shown in FIG. 14.

Once the MME 1120 receives the information related to flows, (along with the QoS and ARP info), from the S-GW 11150 that are serviced by content servers that are either close to the base station or co-located with the base station, for example content server 1150, the MME 1120 will process this information. The MME 1120 sends this information to the base station 1110 so that the base station 1110 may configure the Uu interface similar to the LTE baseline but does not need to configure the S1-U interface which is significantly different from the LTE baseline behavior. Instead the MME 1120 instructs the base station 1110 to configure the IP routing policies to send/receive data from the content server 1150 for these flows.

For flow#1 1190, the MME 1120 provides the required content server information to the base station 1110. It sends the content server information as appropriate to the base station 1110 via the S1-C interface along with other information. This information to the base station 1110 may be sent for example using E-RAB Setup or E-RAB Modify message over the S1-C interface. The message updates are shaded as shown in FIG. 15. Only the E-RAB Setup message is shown for demonstration purposes. The MME 1120 also sends policy enforcement and charging related information to the base station 1110 related to these flows.

The S1-U interface may be extended so that the base station 1110 may forward the collected information for the life of flow#1 1190 to the S-GW 1115, which in turn may forward this to the P-GW 1125. This may be achieved by introducing new messages to carry policy enforcement and charging information on S1-U interface. In another example, the S1-C interface may be updated so that the base station 1110 may forward the collected information for the life of flow#1 1190 to the MME 1120, which in turn forwards this to the S-GW 1115, which in turn forwards the information to the P-GW 1125.

The base station 1110 may use the content server information provided by the MME 1120 to identify the flows that are serviced by co-located or local content servers. It will update its IP routing policy based on this information for these policies. The base station 1110 may not establish the S1-U links for these flows towards the S-GW 1115. The base station 1110 may use the policy enforcement and charging information for these flows. It collects the charging information through the life of the call and sends this information to the S-GW 1115 or the MME 1120 based on whether offline or online charging schemes are used.

Embodiments

1. A method of data flow splitting with local data caching, the method comprising caching data in at least one local data storage, each local data storage site connected to a network node.

2. The method of embodiment 1, further comprising receiving feedback regarding delivery statistics of split-data transmission.

3. The method as in any one of the preceding embodiments, further comprising coordinating with a cooperating base station for split data transmission of cached data to a wireless transmit/receive unit (WTRU).

4. The method as in any one of the preceding embodiments, further comprising mapping a radio bearer service to the at least one local data storage.

5. The method as in any one of the preceding embodiments, further comprising transmitting an address of the radio bearer service to the at least one local data storage.

6. A method for edge caching, comprising intercepting application signaling for a service.

7. The method as in any one of the preceding embodiments, further comprising querying a file name server to determine if data is cached at a content server.

8. The method as in any one of the preceding embodiments, further comprising receiving a response with respect to storing of the data at the content server.

9. The method as in any one of the preceding embodiments, wherein the response includes an address of the content server on a condition that the data is stored at the content server.

10. A system for edge caching, comprising at least one content server associated with a network entity.

11. The system as in embodiment 10, further comprising an application function entity configured to intercept application signaling of a service from a wireless transmit/receive unit (WTRU).

12. The system as in any one of embodiments 10-11, further comprising a file name server configured to determine contents of the at least one content server.

13. The system as in any one of embodiments 10-12, further comprising an interface configured to communicate between the application function and the file name server.

14. The system as in any one of embodiments 10-13, further comprising a domain name system configured to operate with the file name server.

15. The system as in any one of embodiments 10-14, further comprising a policy and charging rules function (PCRF) entity configured to communicate with the application function entity, wherein the application function entity transmits data caching status at the least one content server, content server address, and address of closest network node to the at least one content server.

16. The system as in any one of embodiments 10-15, wherein the closest network node includes at least Internet Protocol (IP) flow based routing policies.

17. The system as in any one of embodiments 10-16, wherein IP flow bypasses certain network nodes on a condition that requested data is on the at least one content server.

18. The system as in any one of embodiments 10-17, further comprising a base station connected to a serving gateway via an interface that supports at least Internet Protocol (IP) flow based routing policies.

19. The system as in any one of embodiments 10-18, further comprising a packet data network gateway (P-GW) configured to send Policy Control and Charging (PCC) rules to the closest network node for a given IP flow.

20. The system as in any one of embodiments 10-19, further comprising a primary base station configured to configure the at least one content server to scale a data file according to a radio transmission environment.

21. The system as in any one of embodiments 10-20, wherein scaling the data file includes at least modifying a transmission rate or a quality of service.

22. A method for determining policies for data flows, comprising receiving from an application function entity content server information for at least one data flow.

23. The method as in any one of embodiments 1-9 and 22, further comprising determining policies for each data flow based on the content server information.

24. The method as in any one of embodiments 1-9 and 22-23, further comprising sending the policies for each data flow to a network entity.

25. The method as in any one of embodiments 1-9 and 22-24, wherein the network entity is a public data network (PDN) through PDN gateway (P-GW) that includes a policy control and enforcement function entity.

26. The method as in any one of embodiments 1-9 and 22-25, wherein the network entity is a serving gateway (S-GW) that includes a Bearer Binding and Event Reporting Function (BBERF).

27. The method as in any one of embodiments 1-9 and 22-26, wherein the policies are at least a routing policy.

28. The method as in any one of embodiments 1-9 and 22-27, wherein the at least one data flow is an Internet Protocol flow.

29. A method of data flow splitting with local data caching, the method comprising caching data in a local data storage connected to a base station.

30. The method as in any one of embodiments 1-9 and 22-29, further comprising coordinating with a cooperating base station for split-data transmission of cached data to a wireless transmit/receive unit (WTRU).

31. The method as in any one of embodiments 1-9 and 22-30, wherein a serving gateway (S-GW) data is split in a core network.

32. The method as in any one of embodiments 1-9 and 22-31, wherein packet data convergence protocol (PDCP) data is split in a radio access network.

33. The method as in any one of embodiments 1-9 and 22-32, wherein a different security key is assigned to each site.

34. The method as in any one of embodiments 1-9 and 22-33, wherein the same security key is assigned to all sites and each site transmits using a distinct packet data convergence protocol (PDCP) sequence number (SN) pattern.

35. The method as in any one of embodiments 1-9 and 22-34, further comprising receiving feedback of total amount of data delivered for a reporting duration.

36. The method as in any one of embodiments 1-9 and 22-35, further comprising determining a transmission rate of split data from all cooperating sites based on the feedback.

37. The method as in any one of embodiments 1-9 and 22-36, wherein the transmission rate is a predetermined ratio or specified number.

38. The method as in any one of embodiments 1-9 and 22-37, wherein data is split in medium access control (MAC) or radio link control (RLC) entity.

39. An apparatus comprising a cache for storing data.

40. The apparatus of embodiment 39, further comprising an interworking flow control (IWFC) entity configured to coordinate fetching of cache data and feedback regarding data delivery statistics.

41. The apparatus of any one of embodiments 39-40, wherein the IWFC entity is configured to determine a current site transmission rate using reported amount of delivered data to a wireless transmit/receive unit (WTRU).

42. The apparatus of any one of embodiments 39-41, wherein the site transmission rate is determined by adding a configured percentage of available radio capacity.

43. The apparatus of any one of embodiments 39-42, wherein data fetching patterns is preconfigured.

44. The apparatus of any one of embodiments 39-43, wherein the site transmission rate is signaled via X2 interface to an IWFC entity on a cooperating site.

45. The apparatus of any one of embodiments 39-44, wherein the IWFC entity is configured to distribute a fetching pattern index or an average skipped data ratio.

46. The apparatus of any one of embodiments 39-45, wherein the IWFC entity is configured to distribute an aggregate average transmission rate or each base stations average transmission rate.

47. The apparatus of any one of embodiments 39-46, wherein the IWFC entity is configured to distribute a target max deviation from a target transmission rate.

48. The apparatus of any one of embodiments 39-47, wherein the IWFC entity is configured to signal when a transmission rate needs to be adjusted.

49. The apparatus of any one of embodiments 39-48, wherein the IWFC entity is configured to monitor an actual delivery rate and IWFC messages from cooperating base stations and make corrections to flow rates.

50. The apparatus of any one of embodiments 39-49, wherein the IWFC entity is configured to indicate timing information for when any changes in a fetching pattern are made.

51. The apparatus of any one of embodiments 39-50, wherein the IWFC entity is configured to signal to cooperating base stations which layers of a scalable video codec (SVC) video to transmit.

52. The apparatus of any one of embodiments 39-S1, wherein the IWFC entity is configured to choose to transmit a video frame of lower quality and lower data rate, with the same overall rate in terms of a video view rate.

53. The apparatus of any one of embodiments 39-52, wherein the IWFC entity is configured to use radio transmission quality and congestion for data transfer optimization.

54. The apparatus of any one of embodiments 39-53, wherein the IWFC entity is configured to examine if there is a significant difference in reference signal received quality (RSRQ) or overall delivery rates between different sites.

55. The apparatus of any one of embodiments 39-54, wherein if the RSRQ or deliverable rate deviates above a configurable threshold, the IWFC entity is configured to instruct the cooperating site to transmit lower class video frames with a lower RSRQ or delivery rates and base class frames with a higher RSRQ or delivery rates.

56. The apparatus of any one of embodiments 39-55, wherein the IWFC entity is configured to access a service type of a call.

57. The apparatus of any one of embodiments 39-56, wherein if the service type is not of live streaming, the IWFC entity chooses to request each site to transfer segments of a file.

58. The apparatus of any one of embodiments 39-57, wherein the IWFC entity is configured to choose between frame interleaving or file segmentation.

59. The apparatus of any one of embodiments 39-58, wherein the IWFC entity is configured to provide information required to determine service charging to a core network.

60. The apparatus of any one of embodiments 39-59, wherein the IWFC entity is configured to initiate a request to a core network application service or a verification entity to check if a target site for handover has desired application data cached.

61. An apparatus configured to implement a process as in any one of embodiments 1-9 and 22-38.

62. An integrated circuit configured to implement a process as in any one of embodiments 1-9 and 22-38.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, implemented by a flow control entity in a base station, of data flow splitting with local data caching, the method comprising:
    receiving feedback regarding delivery statistics of split-data transmission from at least one cooperating base station;
    determining site transmission rates of split-data for the base station and the at least one cooperating base station, respectively, based on the received feedback;
    providing, to each of the at least one cooperating base station and the base station, a respective fetching pattern for fetching cached data from at least one local data storage and a respective target transmission rate for split-data transmission, by the base station and the at least one cooperating base station, of the cached data to a wireless transmit/receive unit (WTRU), wherein the fetching patterns and target transmission rates are determined based on the determined site transmission rates;
    receiving additional feedback from the at least one cooperating base station and adjusting the fetching patterns and target transmission rates based on the additional feedback; and
    providing the adjusted fetching patterns and target transmission rates to the base station and cooperating base station.

2. The method of claim 1, further comprising:
    mapping a radio bearer service to the at least one local data storage; and
    transmitting an address of the radio bearer service to the at least one local data storage.

3. The method of claim 1, wherein the flow control entity is an Inter-Working Flow Control (IWFC) entity.

4. The method of claim 3, wherein the IWFC entity is above a radio resource control (RRC) entity.

5. A flow control entity in a base station configured to split-data flow with local data caching, the flow control entity comprising:
    the flow control entity configured to receive feedback regarding delivery statistics of split-data transmission from at least one cooperating base station;
    the flow control entity configured to determine site transmission rates of split-data for the base station and the at least one cooperating base station, respectively, based on the received feedback;
    the flow control entity configured to provide, to each of the at least one cooperating base station and the base station, a respective fetching pattern for fetching cached data from at least one local data storage and a respective target transmission rate for split-data transmission, by the base station and the at least one cooperating base station, of the cached data to a wireless transmit/receive unit (WTRU), wherein the fetching patterns and target transmission rates are determined based on the determined site transmission rates;
    the flow control entity configured to receive additional feedback from the at least one cooperating base station and adjusting the fetching patterns and target transmission rates based on the additional feedback; and
    the flow control entity configured to provide the adjusted fetching patterns and target transmission rates to the base station and cooperating base station.

6. The flow control entity of claim 5, further configured to:
    map a radio bearer service to the at least one local data storage; and
    provide an address of the radio bearer service to the at least one local data storage.

7. The flow control entity of claim 5 configured as an Inter-Working Flow Control (IWFC) entity.

8. The flow control entity of claim 7, wherein the IWFC entity is above a radio resource control (RRC) entity.

9. The method of claim 1, wherein the split-data transmitted by the base station and the at least one cooperating base station is combined at the WTRU.

10. The method of claim 1, wherein the at least one local data storage is located at the base station.

11. The method of claim 1, wherein the at least one local data storage is located at the cooperating base station.

12. The method of claim 1, wherein the at least one local data storage is located in a core network (CN).

13. The flow control entity of claim 5, wherein the split-data transmitted by the base station and the at least one cooperating base station is combined at the WTRU.

14. The flow control entity of claim 5, wherein the at least one local data storage is located at the base station.

15. The flow control entity of claim 5, wherein the at least one local data storage is located at the cooperating base station.

16. The flow control entity of claim 5, wherein the at least one local data storage is located in a core network (CN).

* * * * *